(12) United States Patent
Sanford O'neill et al.

(10) Patent No.: US 12,468,187 B2
(45) Date of Patent: Nov. 11, 2025

(54) LIQUID CRYSTAL FOR LIGHT MODULATION

(71) Applicant: Oxford University Innovation Limited, Oxford (GB)

(72) Inventors: John Sanford O'neill, Oxford (GB); Patrick Salter, Oxford (GB); Stephen Morris, Oxford (GB); Steve Elston, Oxford (GB); Martin Booth, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 18/702,414

(22) PCT Filed: Oct. 10, 2022

(86) PCT No.: PCT/GB2022/052563
§ 371 (c)(1),
(2) Date: Apr. 18, 2024

(87) PCT Pub. No.: WO2023/079258
PCT Pub. Date: May 11, 2023

(65) Prior Publication Data
US 2024/0419027 A1    Dec. 19, 2024

(30) Foreign Application Priority Data
Nov. 2, 2021 (GB) .................................... 2115741

(51) Int. Cl.
*G02F 1/1334* (2006.01)
*G02F 1/1343* (2006.01)

(52) U.S. Cl.
CPC ...... *G02F 1/13342* (2013.01); *G02F 1/13439* (2013.01); *G02F 2201/305* (2013.01)

(58) Field of Classification Search
CPC ............. G02F 1/13342; G02F 1/13439; G02F 2201/305; G02F 1/1343; G03H 1/04
See application file for complete search history.

(56) References Cited

U.S. PATENT DOCUMENTS

2017/0371211 A1  12/2017  Zeng et al.
2021/0229483 A1   7/2021  Tartan et al.
(Continued)

FOREIGN PATENT DOCUMENTS

| | | |
|---|---|---|
| EP | 3 788 440 A1 | 3/2021 |
| JP | 2014178712 A | 9/2014 |
| WO | 2020/002881 A1 | 1/2020 |

OTHER PUBLICATIONS

International Search Report and Written Opinion for WO 2023/079258 (PCT/GB2022/052563), dated Jan. 4, 2023, pp. 1-10.
(Continued)

*Primary Examiner* — Tracie Y Green
(74) *Attorney, Agent, or Firm* — Thomas|Horstemeyer, LLP

(57) ABSTRACT

A liquid crystal device (400) is provided comprising: a liquid crystal layer having a thickness and comprising: a liquid crystal material; and a plurality of polymer structures (414a, 414b) comprising polymerised liquid crystal material. Each polymer structure (414a, 414b) is located at a different depth in the thickness of the liquid crystal layer. Electrodes are provided configured to apply an electric field to the liquid crystal layer. Each polymer structure (414a, 414b) has a different selected locked-in liquid crystal state.

20 Claims, 18 Drawing Sheets

(56) References Cited

U.S. PATENT DOCUMENTS

2021/0263358 A1* 8/2021 Fells ................. G02F 1/133541
2023/0004052 A1* 1/2023 Komitov ............. G02F 1/16756

OTHER PUBLICATIONS

UK Search Report for GB 2115741.7, dated Apr. 12, 2022, pp. 1-2.
Tartan Chloe C et al: "Localised polymer networks in chiral nematic liquid crystals for high speed photonic switching", Journal of Applied Physics, American Institute of Physics, 2 Huntington Quadrangle, Melville, NY 11747, vol. 119, No. 18, May 14, 2016 (May 14, 2016).
C. C. Tartan et al: "Generation of 3-dimensional polymer structures in liquid crystalline devices using direct laser writing", RSC Advances, vol. 7, No. 1, Jan. 1, 2017 (Jan. 1, 2017), pp. 507-511.
IEICE Transactions on Electronics [online], E91-C(10), pp. 1581-1586, Oct. 1, 2008, Lee et al., "Fabrication of Micro-grating Structures by Direct Laser Writing".

\* cited by examiner

LIQUID CRYSTAL FOR LIGHT MODULATION

CROSS-REFERENCE TO RELATED APPLICATIONS

This application is the National Stage of International Application No. PCT/GB2022/052563, filed Oct. 10, 2022, which claims priority to GB 2115741.7, filed Nov. 2, 2021, which are entirely incorporated herein by reference.

TECHNICAL FIELD

The present invention relates to liquid crystal devices, and in particular but not exclusively, to liquid crystal devices and methods for manipulating the spatial distribution of light.

BACKGROUND

Diffractive optical elements (DOEs) are optical components that are designed to manipulate the spatial distribution of light. DOEs range from simple gratings that split a light beam into a number of diffracted light beams, to computer-generated holograms (CGHs) that diffract light into a recognisable image. Applications of DOEs span across a vast number of industries and include holographic displays, augmented reality (AR) and virtual reality (VR), spectroscopy, aberration correction, beam steering, beam shaping and 3D depth sensing.

Due to their combination of high birefringence and sensitivity to external electric fields, liquid crystals (LCs) have found use as switchable optical materials in spatial light modulators and single-pixel DOEs.

Liquid Crystal on Silicon (LCOS) SLMs allow switching between arbitrary pixelated DOE designs with a switching speed of a few ms. However, those pixelated devices are complex and require CMOS backplane electronics to drive the individual pixels of the LC layer.

For many tasks, it is more convenient to use single-pixel LC-DOEs. However, conventional single-pixel devices have a simple device architecture which provides much less flexibility than SLMs, typically only capable of switching between an OFF state and a single ON state. The earliest implementations of such optical elements employed a variety of conventional lithographic methods to pattern surface relief structures into standard negative photoresists before they were transformed into an active device by adding a layer of index-matched liquid crystalline material. However, the fabrication of useful devices using this principle is limited by the complex multi-step fabrication processes required. Furthermore, challenges exist in controlling the alignment of the LC on the fabricated polymer structures, with unwanted defects inhibiting device performance.

One ON/OFF switchable LC-DOE technology is holographic polymer dispersed LC (H-PDLC), which is formed by exposing a device containing a mixture of LC and photosensitive isotropic monomer to a UV interference pattern. A significant disadvantage of H-PDLC is that, compared to bulk LCs, large electric fields (15 to 20 V/µm) are required to switch off the diffraction, due to the confinement of the LC into micrometer or nanometer sized droplets.

In response to this, a variation of H-PDLC called POLICRYPS (Polymer Liquid CRYstal Polymer Slices) was developed by Caputa et al. that switches with external fields of just a few V/µm and provides high diffraction efficiencies. Although the interference lithography fabrication process for H-PDLC/POLICRYPS is flexible and fast, it is limited to producing gratings that are on (i.e., produce a diffraction pattern) in the absence of an applied field. For some optical applications, including AR/VR, it is desirable to use gratings that do not consume power in the off-state and therefore hidden and operate in reverse-mode (non-diffractive by default at 0 V). H-PDLC/POLICRYPS technologies are currently unable to provide a solution for such applications.

Previously reported reverse-mode LC-DOEs have been fabricated using interference of UV lasers to create a modulated intensity pattern that is encoded directly into a device containing a UV-sensitive polymerizable LC/reactive mesogen mixture. Applying a voltage to those devices after fabrication causes the LC in the unpolymerized channels to reorient, producing a refractive index mismatch between the polymer structures and the LC that results in diffraction. However, employing such holographic interference fabrication methods limits grating designs to simple periodic structures. Within those constraints, the most complex LC-DOEs created in this way have been 2D hexatic lattices of micropillars.

The present invention has been devised with the foregoing in mind.

SUMMARY

According to a first aspect of the invention, there is provided a liquid crystal device. The liquid crystal device may comprise a liquid crystal layer having a thickness. The liquid crystal layer may comprise a liquid crystal material. The liquid crystal layer may also comprise a plurality of polymer structures comprising polymerised liquid crystal material. Each polymer structure may be located at a different depth in the thickness of the liquid crystal layer. The liquid crystal device may also comprise electrodes configured to apply an electric field to the liquid crystal layer.

The depth of a polymer structure may be the depth of a centroid of a volume of the polymer structure. Each polymer structure may be formed in or comprise a separate or distinct sub-layer of the liquid crystal layer, for example through a thickness of the liquid crystal layer.

Writing multiple polymer structures within a single liquid crystal device may increase the functionality and utility of the device. The device may be switchable between a plurality of distinct active states rather than simply between on and off. Each polymer structure may provide or correspond to a separate active state. Additionally or alternatively, a plurality of the polymer structures may be operable in conjunction with one another to adjust or control a spatial phase modulation of light incident on the device.

That increased functionality may also be controlled simply by increasing or decreasing a voltage applied to or across the device, rather than using complex backplane electronics as typically required by switchable SLMs. That functionality may provide a compromise between fully programmable SLM devices and fixed optical elements, and may be employable in a wide variety of applications. The device may also support multiple modes of operation, for example conventional-mode operation (optically active by default under no applied voltage) and reverse-mode operation (optically inactive under no applied voltage).

At least two of the polymer structures may at least partially spatially overlap one another in a direction extending through the thickness of the liquid crystal layer.

Two or more polymer structures may have a different selected locked-in liquid crystal state. Optionally, each polymer structure may have a different selected locked-in liquid crystal state. Alternatively, two or more polymer structures may have the same locked-in liquid crystal state.

The polymer structures being disposed at different depths in a thickness of the liquid crystal composition may enable the functionality of the device to be provided without increasing a footprint of the device. The footprint may be reduced or minimized if two or more of the polymer structures at least partially overlap one another in a direction extending through the thickness of the liquid crystal layer.

Each polymer structure may be configured to provide a different spatial phase modulation of light incident on the device. That may increase the number of different (for example, distinct) optical states or functions provided by the device. Additionally or alternatively, the spatial phase modulations provided by two or more polymer structures may operate together to provide a single optical state or function.

The electrodes may be configured to apply an electric field across at least a part of the liquid crystal layer. The electrodes may comprise a first electrode and a second electrode configured to apply a field across the thickness of the liquid crystal layer.

The electrodes may be operable to apply a substantially uniform electric field.

At least one of the electrodes may comprise a plurality of individually addressable electrode elements. Each electrode element may be configured to apply an electric field across a different part of the liquid crystal layer. At least one of the electrodes may comprise a patterned electrode, or may comprise an electrode array. The patterned electrode array or electrode array may be or comprise a plurality of concentric rings.

Each of the different liquid crystal states of the polymer structures may correspond to a state of the liquid crystal material at a different pre-determined electric field strength.

At least one of the polymer structures may comprise a plurality of regions of polymerised liquid crystal material.

At least one of the polymer structures may be or comprise a diffractive optical element. Two or more of the polymer structures may be operable in combination with one another to act as a single diffractive optical element.

At least one of the polymer structures may be or comprise a diffraction grating. At least one diffraction grating may be configured to produce a hexatic diffraction pattern. The at least one diffraction grating may be or comprise a triangular mesh. Additionally or alternatively, at least one diffraction grating may be configured to produce a 1-D diffraction pattern. The at least one diffraction grating may be or comprise a plurality of pillars or walls.

At least one of the polymer structures may be or comprise a hologram.

The polymer structures may be or comprise a plurality of stacked layers or sub-layers through a thickness of the liquid crystal device. One or more layers may be or comprise a substantially continuous layer. Additionally or alternatively, one or more layers may be or comprise a discontinuous layer. Two or more layers may be in substantially direct contact with one another. The polymer structures may be or comprise a plurality of stacked discs. Alternatively, the polymer structures may be or comprise a plurality of concentric rings. Each ring may have or comprise a different height or thickness.

The liquid crystal device may further comprise a first substrate and a second substrate. At least one of the polymer structures may be tethered or secured to the first substrate or the second substrate. The plurality of polymer structures may comprise a first polymer structure tethered or secured to the first substrate, and a second polymer structure tethered or secured to the second substrate. The first polymer structure may be at a first depth and the second polymer structure may be at a different second depth. Alternatively or additionally, one or more polymer structures may be at least partially tethered or secured to one or more of the other polymer structures.

According to a second aspect, there is provided an apparatus for correcting optical aberration, comprising the liquid crystal device of the first aspect. That may enable switching between different (e.g., distinct) phase profiles, for example to correct for different aberration modes. The operation may be controlled by increasing or decreasing an applied voltage to switch between the different phase profiles, enabling significantly simpler control than for conventional devices such as SLMs. Additionally or alternatively, that may enable variable control of a magnitude of phase modulation provided by a phase profile, for example to correct for one or more aberration modes. Again, the operation may be controlled by increasing or decreasing an applied voltage to adjust a magnitude of the phase modulation provided by that phase profile.

According to a third aspect, there is provided an optical device comprising the apparatus of the second aspect. The optical device may be a lens, a microscope, telescopes, binoculars or any suitable optical device.

According to a fourth aspect, there is provided a distance-sensing and/or depth-mapping device comprising the liquid crystal device of the first aspect.

Each of the polymer structures may be configured to create a different structured light illumination pattern. For many applications that use distance-sensing and/or depth-mapping technology, devices require extensive miniaturisation and have stringent power consumption requirements. Combining multiple optical functions in the switchable liquid crystal device of the present disclosure may therefore provide a device having multiple active states that can be selected within a compact device structure having a reduced footprint.

According to a fifth aspect, there is provided a holographic display device comprising the liquid crystal device of the first aspect. Stacked or cascaded holograms have been used for applications included multiplexed information display, colour images and multiwavelength optical interconnects. Furthermore, stacked holograms have been employed to improve image resolution and diffraction efficiency over conventional single-layer holograms. The liquid crystal device of the first aspect may provide such advantages within a single device that is easily controllable by adjusting an applied voltage.

According to a sixth aspect, there is provided a virtual reality or augmented reality device comprising the liquid crystal device of the first aspect and/or the optical aberration correction apparatus of the second aspect.

According to a seventh aspect, there is provided a beam-steering and/or beam-shaping device comprising the liquid crystal device of the first aspect and/or the aberration correction apparatus of the second aspect.

According to an eighth aspect, there is provided a method of electrically controlling spatial phase modulation of light incident on a liquid crystal device. The liquid crystal device may comprise a liquid crystal layer having a thickness, and electrodes for applying an electric field to the liquid crystal layer. The liquid crystal layer may comprise a liquid crystal material. The liquid crystal layer may also comprise a plurality of polymer structures comprising polymerised liquid crystal material. Each polymer structure may be located a different depth in the thickness of the liquid crystal layer.

The method may comprise applying an electric field across the liquid crystal layer to selectively control a spatial phase modulation of light incident on the device.

The method of the eighth aspect may be performed on or using the liquid crystal device of the first aspect.

Features which are described in the context of separate aspects and embodiments of the invention may be used together and/or be interchangeable wherever possible. Similarly, where features are described in the context of a single embodiment for brevity, those features may also be provided separately or in any sub-combination. Features described in connection with the liquid crystal device of the first aspect may have corresponding features definable with respect to the apparatus of the second through seventh aspects and the method of the eighth aspect, and vice versa, and those embodiments are specifically envisaged.

BRIEF DESCRIPTION OF THE DRAWINGS

The invention will now be described, by way of example only, with reference to the accompanying drawings in which.

Like reference numbers and designations in the various drawings indicate like elements.

DETAILED DESCRIPTION

Figure 1:
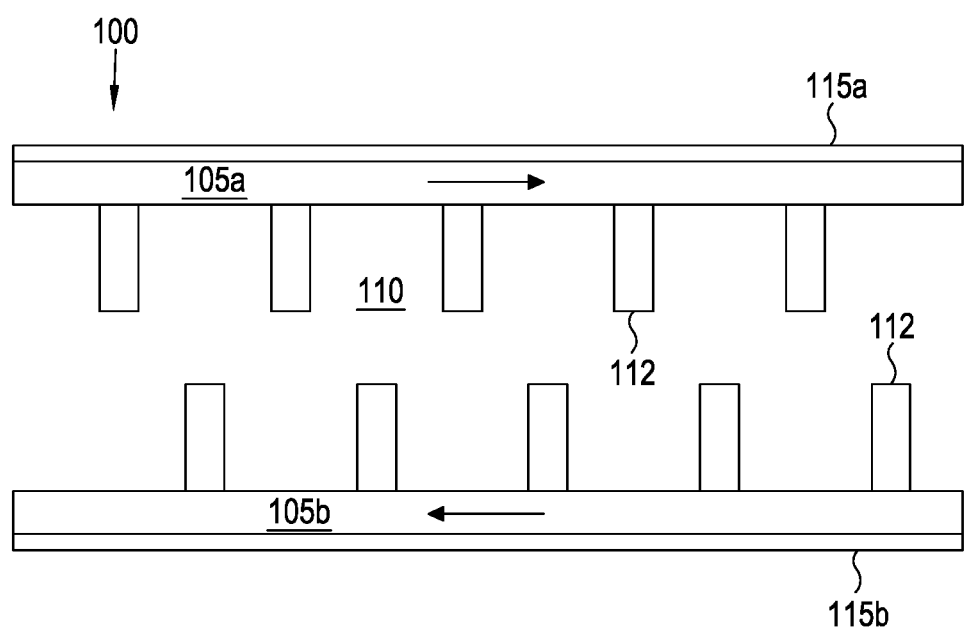
FIG. 1 shows a schematic of a liquid crystal device.

FIG. 1 shows a schematic of a liquid crystal device 100 used in the examples described herein. The device 100 comprises transparent substrates 105a, 105b spaced apart from one another using spacer beads. The substrates 105a, 105b are coated with planar alignment layers. A liquid crystal composition 110 is located between the substrates 105a, 105b. At least some of the liquid crystal composition 110 is polymerised to form polymer structures 112 having a selected locked-in liquid crystal state. The device 100 comprises transparent electrodes 115a, 115b configured to apply an electric field between the substrates 105a, 105b. The electrodes 115a, 115b are disposed on the outside of the substrates 105a, 105b in the example shown (e.g., on an opposite side of the substrates 105a, 105b to the liquid crystal composition 110), although that is not essential. The electrodes 115a, 115b may alternatively be disposed on the inside of the substrates 105a, 105b.

In the examples shown, the liquid crystal composition 110 comprises a mixture of a nematic liquid crystal host, a reactive mesogen and a photoinitiator. In the specific examples, the liquid crystal host is E7, but other materials or compositions may alternatively be used. The reactive mesogen is RM257 (Merck) at a concentration of approximately 30 wt. %, but other compositions and/or concentrations may alternatively be used provided the director of the liquid crystal host can be reoriented in the presence of an electric field. The photoinitiator is Irgacure 819 (Merck) at a concentration of approximately 1 wt. %, but other compositions and/or concentrations may alternatively be used.

In the examples shown, the transparent substrates 105a, 105b comprise glass, although any transparent material may alternatively be used. The substrates 105a, 105b are spaced apart by spacer beads (not shown) to provide a gap between the substrates 105a, 105b. The alignment layers are rubbed in anti-parallel directions (illustrated by the arrows located on the substrates 105a, 105b) to place the liquid crystal material into a homogeneous planar alignment, although that is not essential. The alignment layers comprise polyimide, although any suitable material or composition may alternatively be used. The electrodes 115a, 115b comprise indium tin oxide (ITO), although any transparent electrode material may alternatively be used. In the examples shown, the device 100 comprises anti-parallel rubbed liquid crystal cells manufactured by Instec Inc., although other cells may alternatively be used.

In the examples shown, the polymerizable liquid crystal composition 110 was disposed between the transparent substrates 105a, 105b by capillary filling to form a liquid crystal cell. The liquid crystal composition 110 was prepared via thermal mixing at substantially 70° C. before being disposed between the substrates 105a, 105b, although that is not essential.

To form the polymer structures directly within the liquid crystal device 100, a direct laser writing (DLW) system was used. The liquid crystal device 100 was mounted onto a translation stage and connected to a waveform generator to enable an electric field to be applied to the device 100 during fabrication of polymer structures within the device 100. By forming the polymer structures 112 directly into the liquid crystal device 100, the specific orientation of the liquid crystal molecules (described by a unit vector known as the director) at the precise moment of exposure to the laser beam can be controlled. That provides access to a wider range of director profiles that can be retained, or locked in, by the DLW process than would otherwise be possible if the director profile was governed solely by the alignment layers at the substrates 105a, 105b.

The DLW process utilised femtosecond laser pulses with a pulse width of 100 fs from a Spectra-Physics Tsunami titanium-sapphire oscillator emitting at 780 nm with a repetition rate of 80 MHz. The laser pulses were focused with an Olympus 0.46 NA objective lens into the liquid crystal composition. The power of the fabrication laser used in the examples described herein was just above the polymerization threshold (delivering the minimum necessary energy to the sample for polymerization), empirically found to be 41 mW at a writing speed of 100 µm/s. The polarisation of the laser was oriented to be perpendicular to the rubbing direction of the device 100 with the aid of a half waveplate. The device 100 was mounted onto a stack of high-resolution stages (Aerotech ANT-95XY and ANT95V-3) with a positioning resolution of 1 nm. A halogen light source with a 550 nm long-pass filter was used to provide transmission illumination of the device so the fabrication could be monitored in-situ with a colour CCD without affecting the photocuring process. Polymer walls were fabricated by moving the sample under continuous exposure to the pulsed laser beam at a speed of 100 µm/s. An arbitrary function generator (Tektronix AFG 3021) was used to apply square-wave AC voltages with a frequency of 1 kHz to the device 100 during fabrication of the polymer structures 112.

When the laser pulses are incident on the liquid crystal composition 110 during the DLW process, two-photon absorption by the photoinitiator triggers crosslinking of the reactive mesogen via a free-fradical polymerization reaction that stabilises the molecular alignment of the liquid crystal at the moment of exposure to the laser beam through the formation of a polymer network. The polymerised liquid crystal composition 110 retains, or locks in, the voltage dependent director of the liquid crystal molecules at the moment of exposure to form a polymer structure 112. Different liquid crystal alignments can be retained, or locked in, by exposing the liquid crystal device 100 to different voltage amplitudes during the DLW process. The unpolymerized surrounding bulk liquid crystal material remains free to realign or reorient in the presence of an applied electric field post-fabrication.

The two-photon absorption process that occurs when the laser pulses are incident on the liquid crystal composition leads to the absorption exclusively occurring in the focus of the laser in a small volume termed a voxel. By translating the sample with respect to the laser focus, three-dimensional structures can be constructed voxel-by-voxel.

Figure 2A:
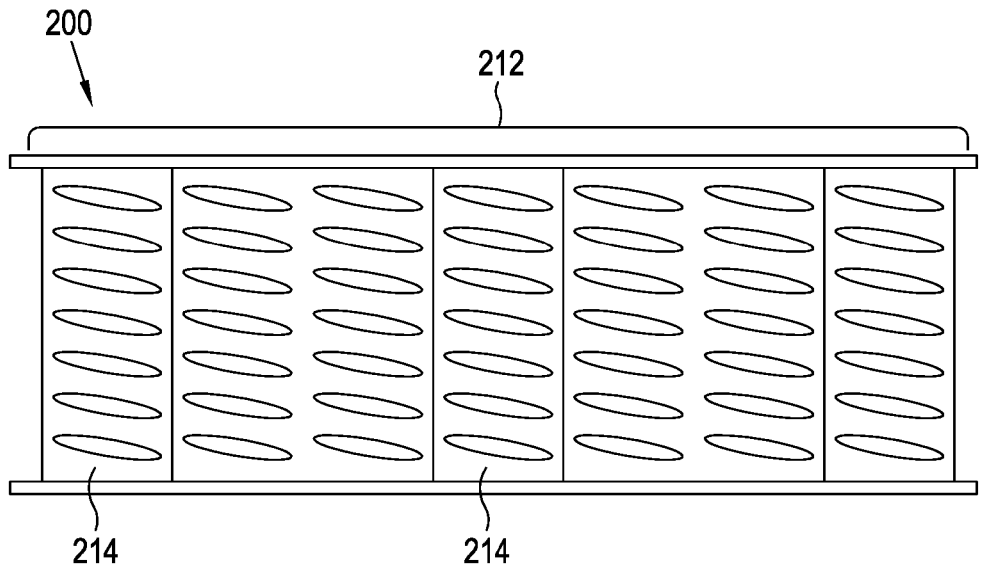
FIGS. 2A and 2B show schematic representations of a liquid crystal device comprising a single layer diffraction grating under an applied voltage of 0 V and 10 V respectively, including an orientation of the liquid crystal molecules.
Figure 2B:
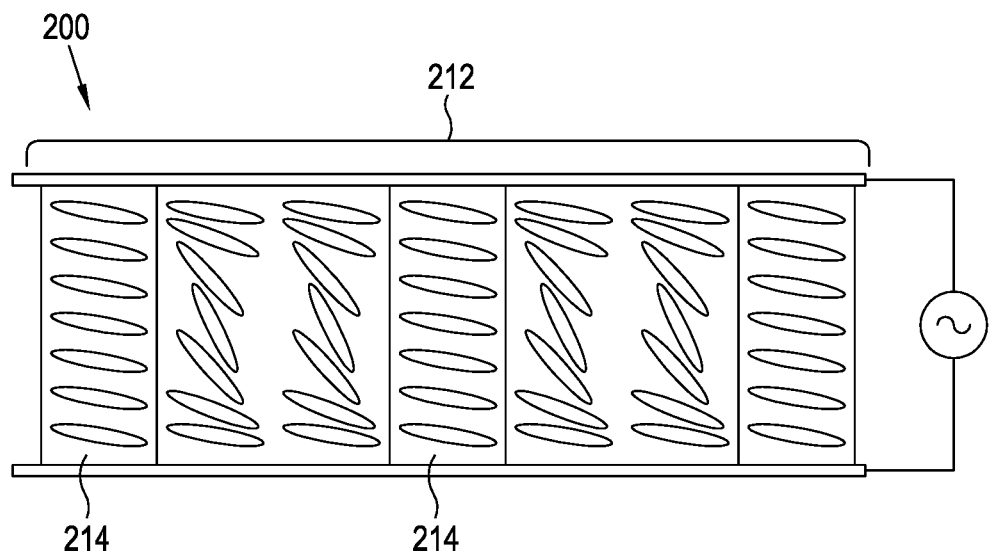

FIGS. 2A and 2B show schematics of a liquid crystal device 200 comprising a single layer diffraction grating 212 fabricated by the DLW process described above. The diffracting grating 212 comprises a plurality of parallel polymer walls 214 with a period of 5 µm. The walls were fabricated at a write voltage of 0 V in order to produce a hidden or reverse mode grating, wherein the default state provides no diffraction. FIG. 2A shows the liquid crystal device 200 at an applied voltage of 0 V, whilst FIG. 2B shows the liquid crystal device 200 at an applied voltage of 10 V.

FIGS. 2A and 2B illustrate the idealised principle of operation behind the switchable diffraction grating shown. With no voltage applied, there is expected to be no difference in the liquid crystal alignment between polymerized and unpolymerized regions (see FIG. 2A). In this state, the device 200 behaves as a uniform birefringent layer and no diffraction occurs. When a voltage is applied above some threshold, the unpolymerized regions switch, with the liquid crystal director (a vector describing the average molecular orientation of the liquid crystal) tending towards vertical as the voltage is increased (see FIG. 2B). In this switched state, light polarised parallel to the rubbing direction will see a modulation in the effective refractive index $n_{eff}$, with higher values of $n_{eff}$ in the polymerized regions and lower values of $n_{eff}$ in the unpolymerized switched regions. At infinite voltage, the unpolymerized regions will tend to no, the ordinary index of refraction, when the director is completely vertical. When light is incident on the device 200, diffraction will occur as a result of this spatial modulation in the refractive index. It is noted that diffraction should not occur for light polarised perpendicular to the rubbing direction. In this geometry, the light will see the ordinary refractive index, no, across the device 200, irrespective of the voltage applied. Thus, there is no spatial modulation in the refractive index and no diffraction occurs.

Figure 2C:
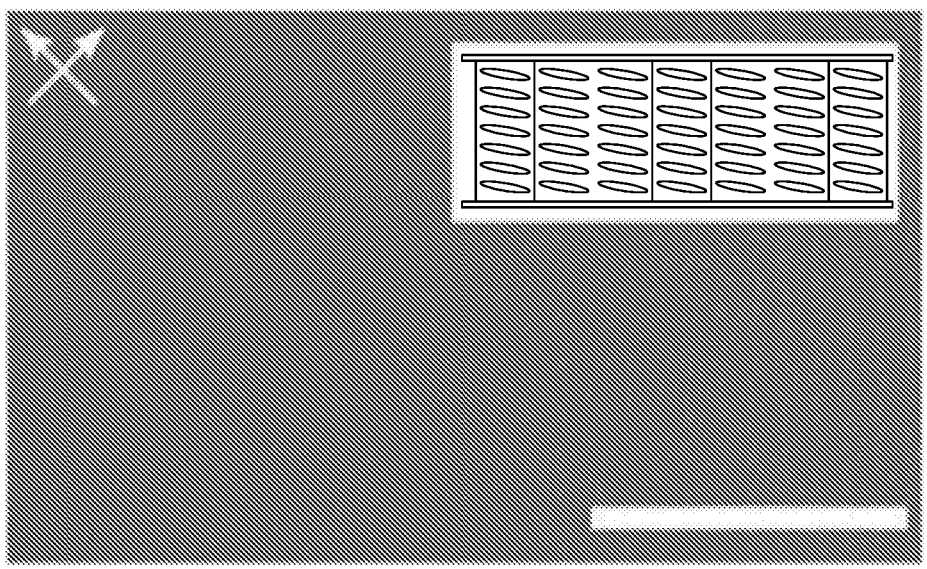
FIGS. 2C and 2D show polarised optical microscope images of the liquid crystal device shown in FIGS. 2A and 2B.
Figure 2D:
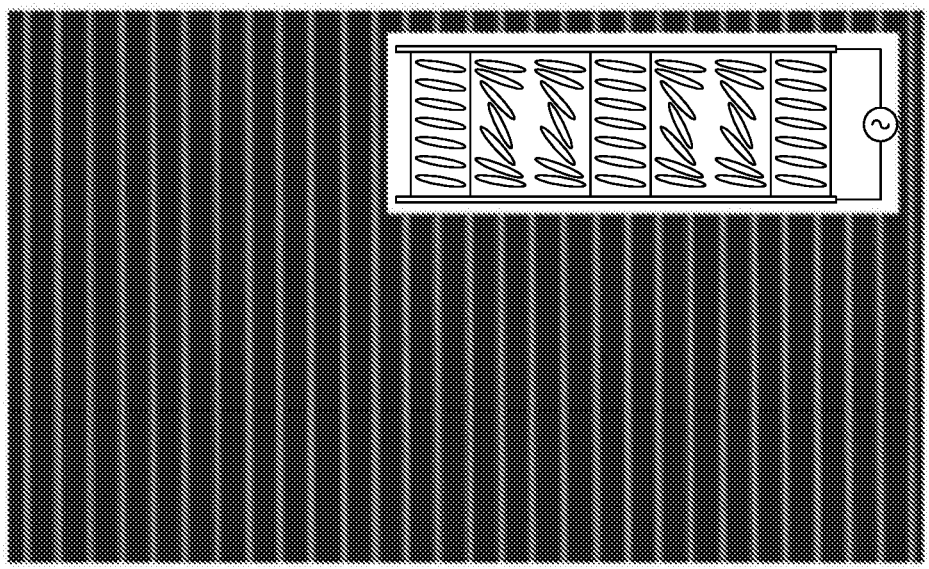

FIGS. 2C and 2D show polarised optical microscopy (POM) images at 50× magnification of the diffraction grating 212 in the device 200 at 0 V and 10 V respectively. The scale bar in the bottom right-hand corner of FIG. 2C is 50 µm. FIGS. 2A and 2B are also inset into FIGS. 2C and 2D respectively, illustrating the orientation of the liquid crystal molecules within the diffraction grating 212 (where the shaded regions indicate polymer network corresponding to the polymer walls 214).

Microscopy was conducted using an Olympus BX51 polarising optical microscope with a QImaging Retiga R6 camera attached to the phototube. Olympus objective lenses were used with the cover slip correction collar set to the thickness of the glass substrates of the liquid crystal device 200, to improve the quality of the images by reducing aberration. A long-pass filter with a cut-off wavelength of 550 nm was inserted between the halogen bulb and the sample to avoid causing any polymerization of unreacted reactive mesogen molecules. The device 200 was oriented such that the rubbing direction was 45° to the transmission axes of the crossed polarisers (indicated by the white arrows in FIG. 2C) by rotating the sample until the bright state was located. MATLAB scripts were written to automate the process of obtaining microscope images at a range of different voltages by controlling an arbitrary function generator (Tektronix AFG 3021) with SCPI commands. The microscope camera was controlled by a command library provided by the manufacturer.

The POM images reveal the spacing of the walls is highly uniform, as is the ~0.9 μm width of the walls themselves. The POM images also reveal that at 0 V, the device 200 behaves as a substantially uniform birefringent layer, with the polymer walls 214 virtually indistinguishable from the surrounding unpolymerized liquid crystal composition and substantially no diffraction taking place. However, at 10 V, the anchoring of the polymer walls 214 is overcome and the director is near-vertical. Due to the locking-in of the homogeneous planar director state in the polymer walls 214, the polymer walls 214 remain birefringent as the surrounding unpolymerized liquid crystal composition switches to a vertical state. The diffraction grating 212 is therefore in an active state at 10 V and diffraction occurs due to the spatial modulation in the refractive index.

Figure 2E:
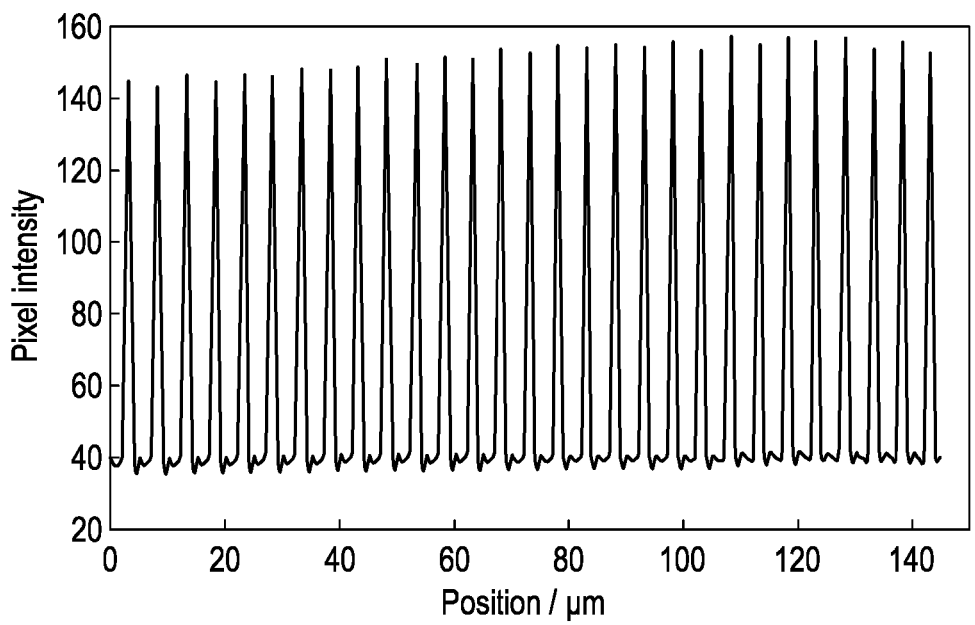
FIG. 2E shows pixel intensity as a function of position in μm for the liquid crystal device of FIGS. 2A and 2B under an applied voltage of 10 V.
Figure 2F:
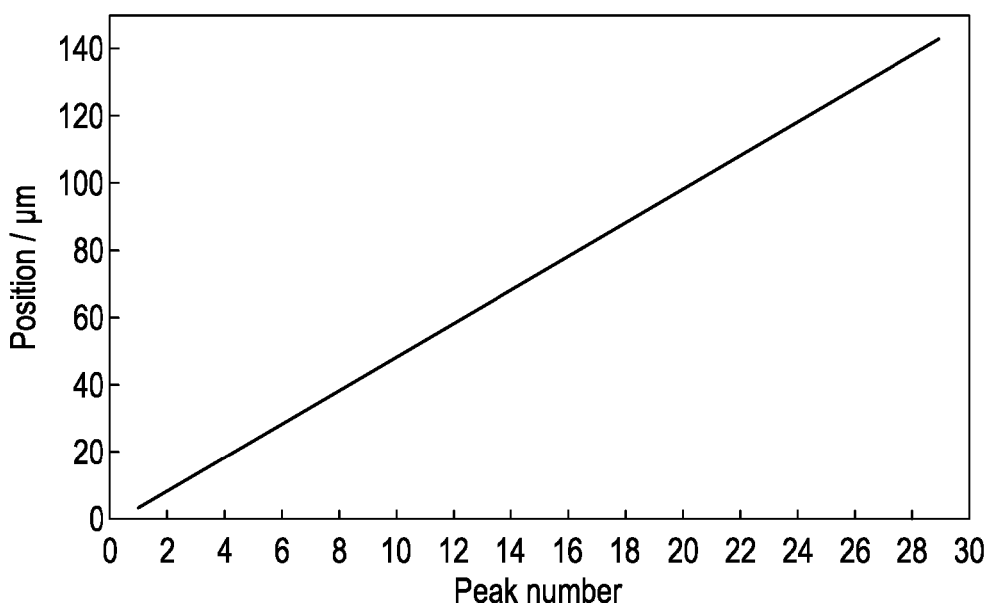
FIG. 2F shows position in μm versus peak number for polymer walls in the liquid crystal device of FIGS. 2A and 2B under an applied voltage of 10 V.

Image analysis was performed to assess the uniformity and width of the walls. The image analysis was conducted by performing horizontal line-scans across a greyscale version of the POM image of the diffracting grating 212 under an applied field of 10 V, as shown in FIG. 2D. These line scans were averaged to reduce noise, and the result is plotted in FIG. 2E where each polymer wall 214 is represented by a peak. The scale was calibrated using a microscope calibration slide with an etched scale. The MATLAB function 'findpeaks' was used to find the location of the peaks and those values are plotted against the peak number, as shown in FIG. 2F. An estimate of the polymer wall width was then obtained with an optional output from the 'findpeaks' function, which calculates the full-width of the peak at half-prominence.

The linearity shown in FIG. 2F shows there is a constant spacing between each polymer wall 214 that forms part of the diffraction grating 212. The mean of the distances between adjacent walls 214 was found to be 5.00 μm and the standard deviation was 0.08 μm which is of the order of the resolution of the image of 0.09 μm/pixel. The uniformity of the peaks themselves in FIG. 2E shows the polymer walls 214 have a highly uniform structure. Averaging the estimated widths of the polymer walls 214 gives a value of 0.87 μm and the standard deviation is just 0.02 μm, showing a very high uniformity of the polymer walls 214.

Figure 2G:
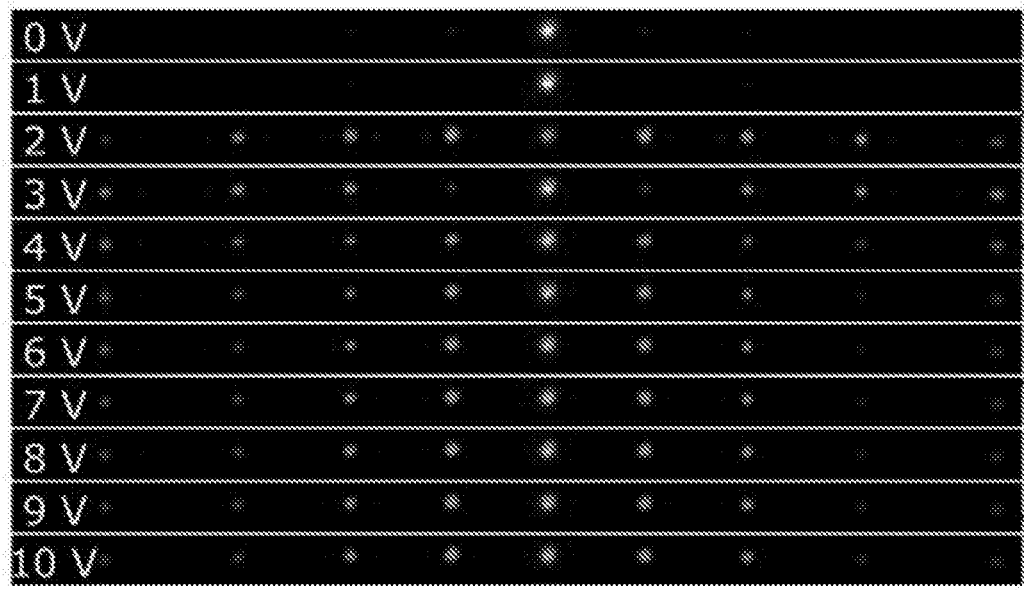
FIG. 2G shows far-field diffraction patterns produced by the liquid crystal device of FIGS. 2A and 2B under a range of applied voltages between 0 V and 10 V.
Figure 2H:
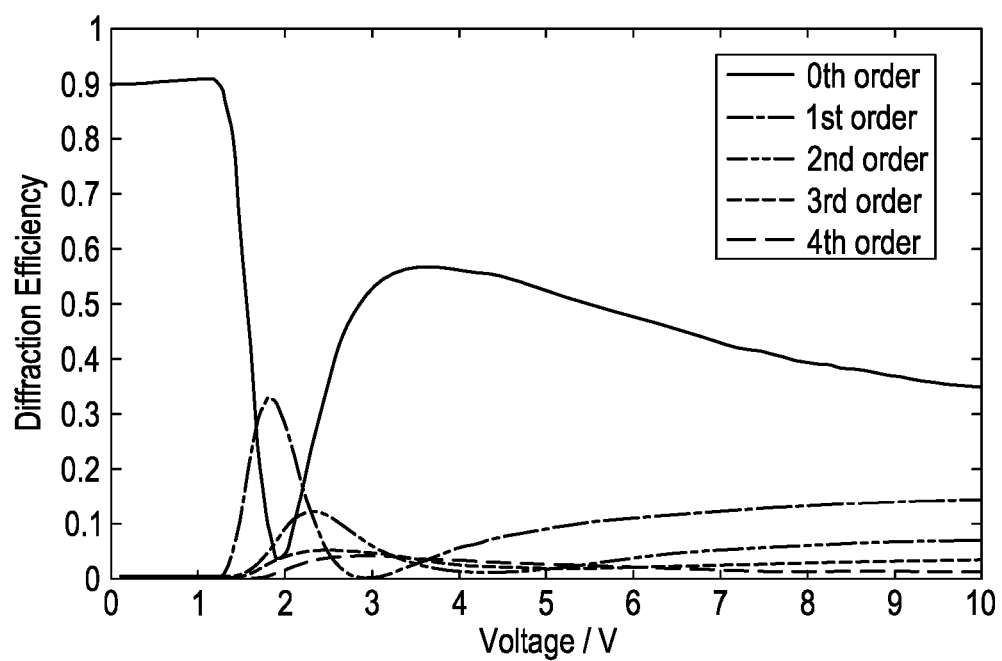
FIG. 2H shows diffraction efficiency of the liquid crystal device of FIGS. 2A and 2B as a function of voltage.

FIG. 2G shows the far field diffraction pattern produced by the device 200 and projected onto a screen at applied voltages between 0 V and 10 V in 1 V increments, while FIG. 2H shows the diffraction efficiency of the first four diffracted orders as a function of voltage. The diffraction efficiency is defined here as the ratio of the intensity of the diffracted order to the incident intensity. In the off-state at 0 V, the polymer network in the polymer walls 214 is in the same state as the unpolymerized liquid crystal composition and so there is no contrast in the effective refractive index and no diffraction. As the voltage is increased, a diffraction pattern appears once the unpolymerized liquid crystal composition begins to switch, producing a refractive index contrast between the polymer walls 214 and the unpolymerized liquid crystal composition. The diffraction grating 212 clearly produces multiple diffracted orders, as is characteristic of the Raman-Nath regime. The maximum diffraction efficiency in the first order of 33.2% is comparable to a value of ~34% previously reported by Kossyrev et al. for a polymer stabilised reverse-mode LC grating fabricated via UV interference.

Examining the behaviour of the diffracted orders at low voltage (<1 V), it can be seen there is low non-zero intensity associated with the first and second orders. That suggests the formation of the polymer network in the polymer walls 214 has slightly disturbed the alignment of the liquid crystal and decreased the effective refractive index from the unpolymerized liquid crystal composition at 0 V. That results in weak diffraction at 0 V because of the small difference in $n_{eff}$ between the polymer walls 214 and the unpolymerized liquid crystal composition. As the voltage is increased, the first order vanishes at 1.2 V, suggesting that as the unpolymerized liquid crystal composition begins to switch, it matches the $n_{eff}$ of the polymer walls 214. That implies the formation of a polymer network slightly reduces the $n_{eff}$ in the polymer walls 214.

Studying the Fréedericksz transition allows the elastic influence of the polymer walls 214 on the switching behaviour of the liquid crystal composition to be observed. The effective Fréedericksz threshold voltage is 1.2 V for the fabricated device 200, which is higher than the pre-polymerized value of 0.7 V. That indicates the influence of the polymer walls 214 increases the magnitude of the electric field required to reorient the liquid crystal director.

Figure 3A:
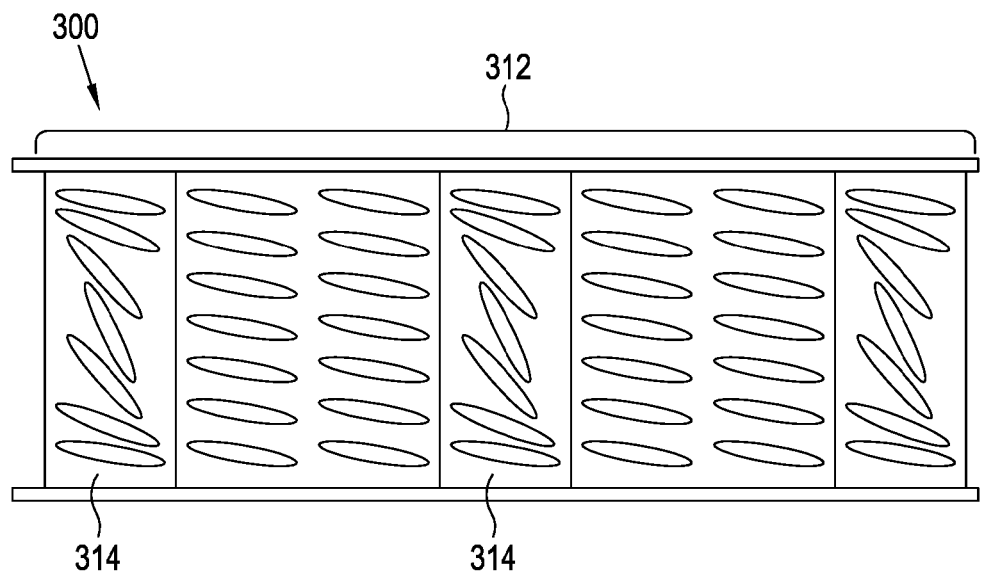
FIGS. 3A and 3B show schematic representations of another liquid crystal device comprising a single layer diffraction grating under an applied voltage of 0 V and 10 V respectively, including an orientation of the liquid crystal molecules.
Figure 3B:
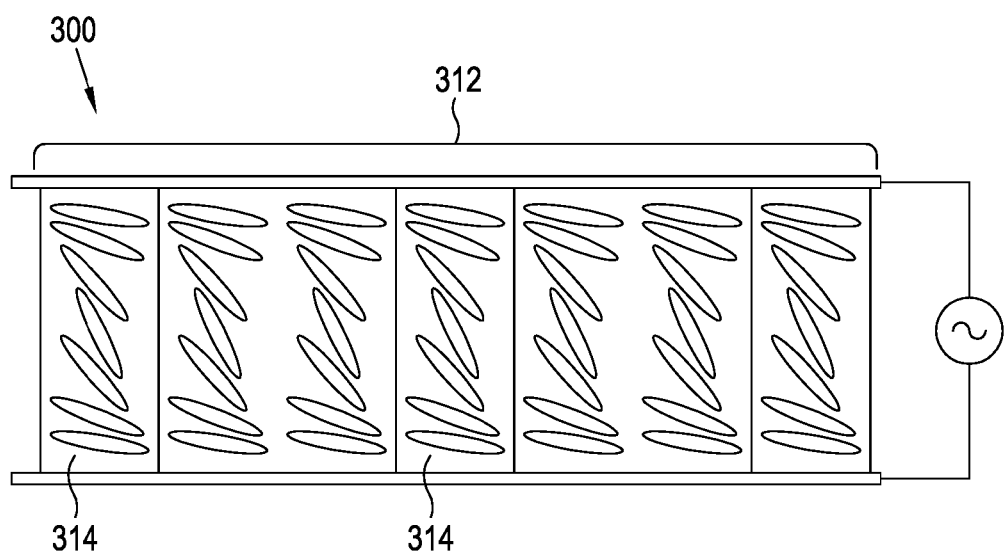

FIGS. 3A and 3B show schematics of another liquid crystal device 300 comprising a single layer diffraction grating 312 fabricated by the DLW process described above. The diffraction grating 312 comprises a plurality of parallel polymer walls 314 with a period of 5 μm, substantially similar to the device 200 described above. However, the polymer walls 314 were fabricated at a write voltage of 1.55 V in order to provide a conventional-mode diffraction grating, in which diffraction is produced at 0 V. FIG. 3A shows the liquid crystal device 300 at an applied voltage of 0 V, whilst FIG. 3B shows the liquid crystal device at an applied voltage of 1.55 V.

With no voltage applied, there is a difference in the liquid crystal alignment between polymerized and unpolymerized regions (see FIG. 3A). In this state, light polarised parallel to the rubbing direction will see a modulation in the effective refractive index, with higher values of $n_{eff}$ in the unpolymerized liquid crystal composition and lower values of $n_{eff}$ in the polymer walls 314. When a voltage of 1.55 V is applied (substantially equal to the write voltage of the polymer walls 314), there is no difference in the liquid crystal alignment between polymerized and unpolymerized regions (see FIG. 3B). In this stage, the device 300 behaves as a uniform birefringent layer and substantially no diffraction occurs.

Figure 3C:
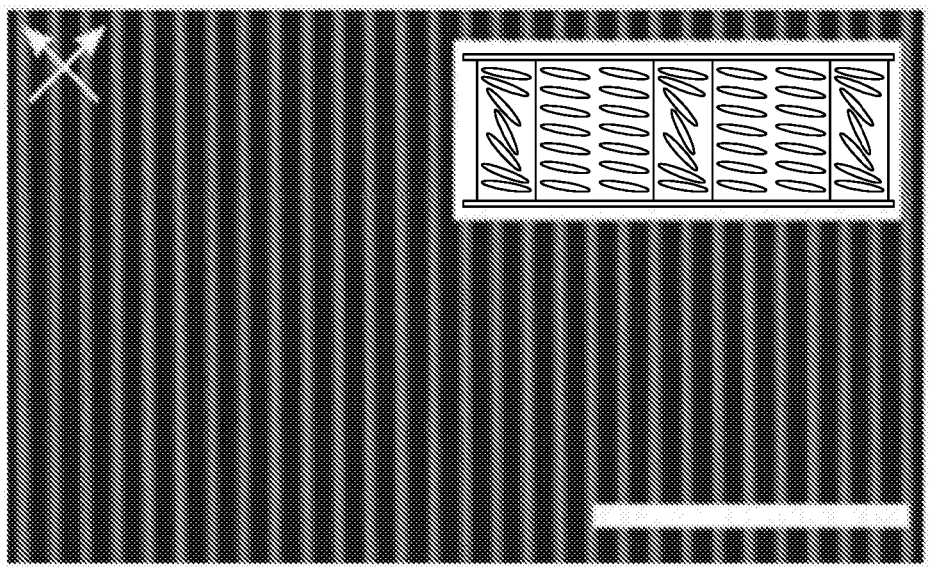
FIGS. 3C and 3D show polarised optical microscope images of the liquid crystal device shown in FIGS. 3A and 3B.
Figure 3D:
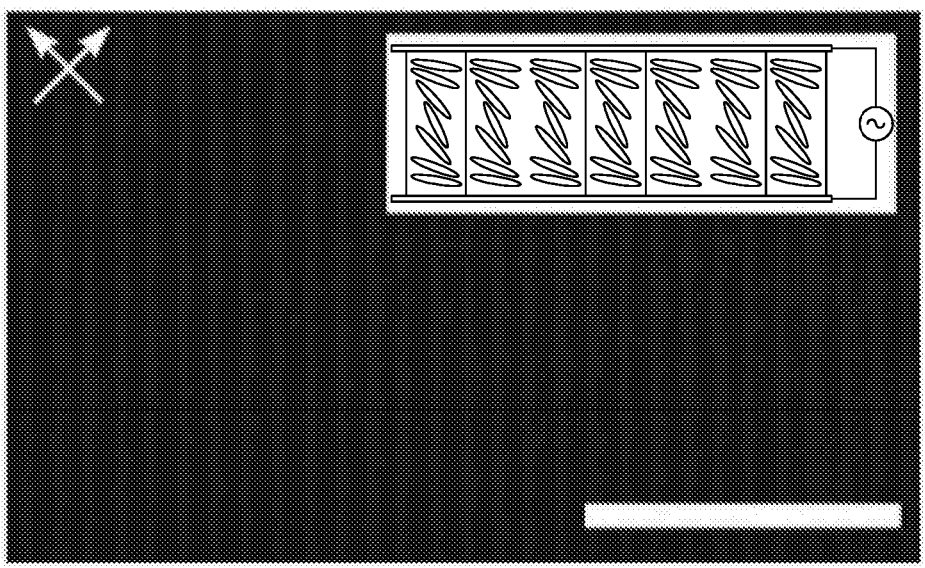

FIGS. 3C and 3D show polarised optical microscopy (POM) images at 50× magnification of the diffraction grating 212 in the device 200 at 0 V and 1.55 V respectively. The scale bar in the bottom right-hand corner of FIG. 3C is 50 μm. FIGS. 3A and 3B are also inset into FIGS. 2C and 2D respectively, illustrating the orientation of the liquid crystal molecules within the diffraction grating 312 (where the shaded regions indicate polymer network corresponding to the polymer walls 314). Similar to the device 200, the diffraction grating 312 has a period of 5 μm.

Figure 3E:
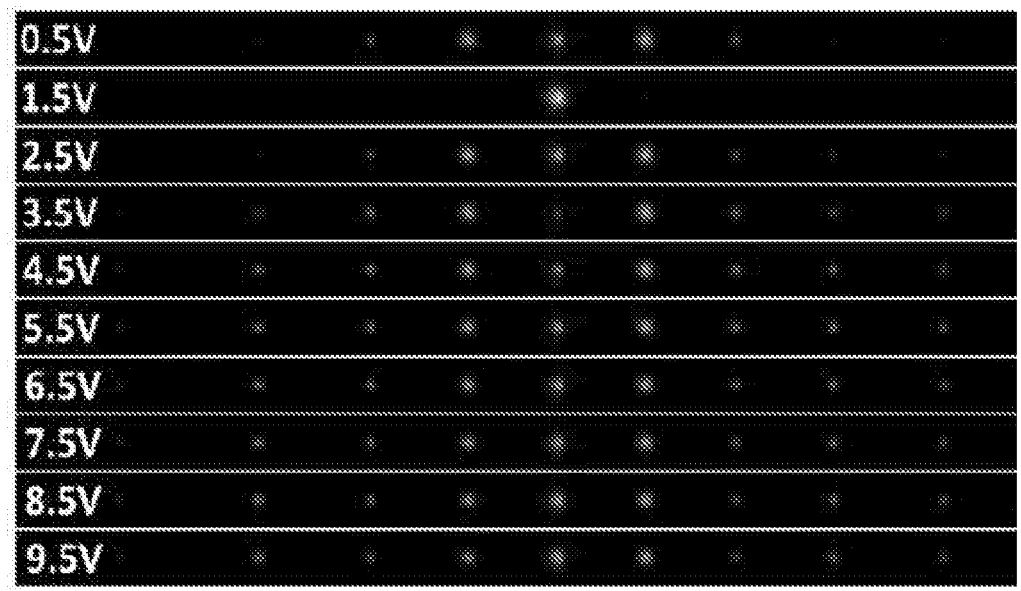
FIG. 3E shows far-field diffraction patterns produced by the liquid crystal device of FIGS. 3A and 3B under a range of applied voltages between 0.5 V and 9.5 V.
Figure 3F:
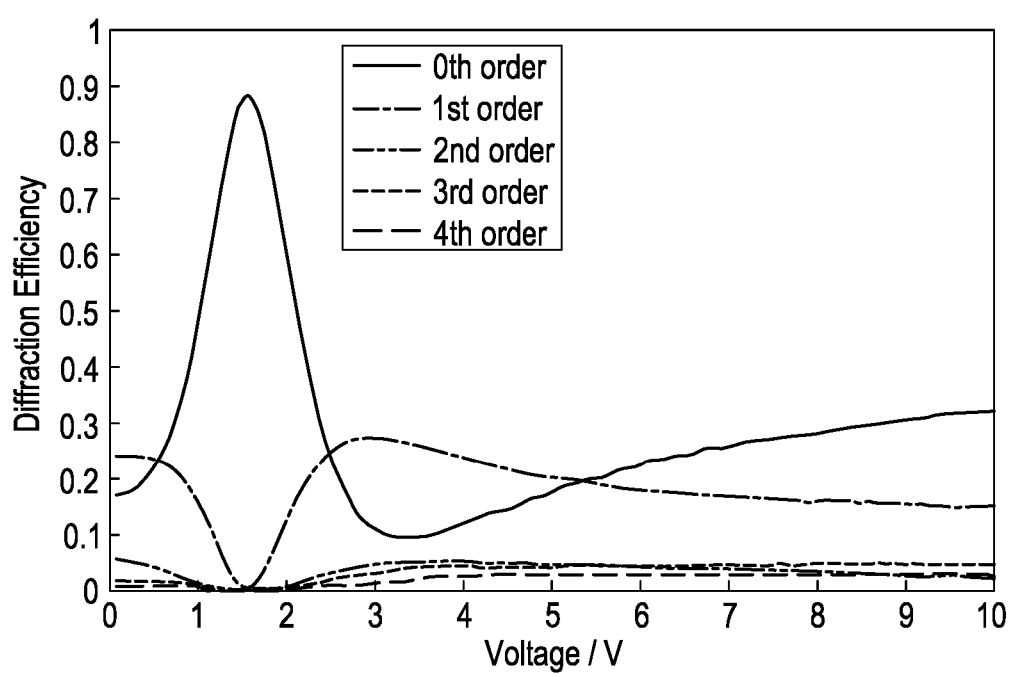
FIG. 3F shows diffraction efficiency of the liquid crystal device of FIGS. 3A and 3B as a function of voltage.

FIG. 3E shows the far field diffraction pattern produced by the device 300 and projected onto a screen at applied voltages between 0.5 V and 9.5 V in 1 V increments, while FIG. 3F shows the diffraction efficiency of the first four diffracted orders as a function of voltage. The diffraction efficiency is defined here as the ratio of the intensity of the diffracted order to the incident intensity. In the off-state at approximately 1.5 V (1.55 V), the polymer network in the polymer walls 314 is in the same state as the unpolymerized liquid crystal composition and so there is no contrast in the effective refractive index and no diffraction. As the applied voltage is increased or decreased away from the off-state of 1.55 V, a diffraction pattern appears once the unpolymerized liquid crystal composition begins to switch, producing a refractive index contrast between the polymer walls 314 and the unpolymerized liquid crystal composition. The diffraction grating 312 clearly produces multiple diffracted orders, as is characteristic of the Raman-Nath regime.

Figure 4A:
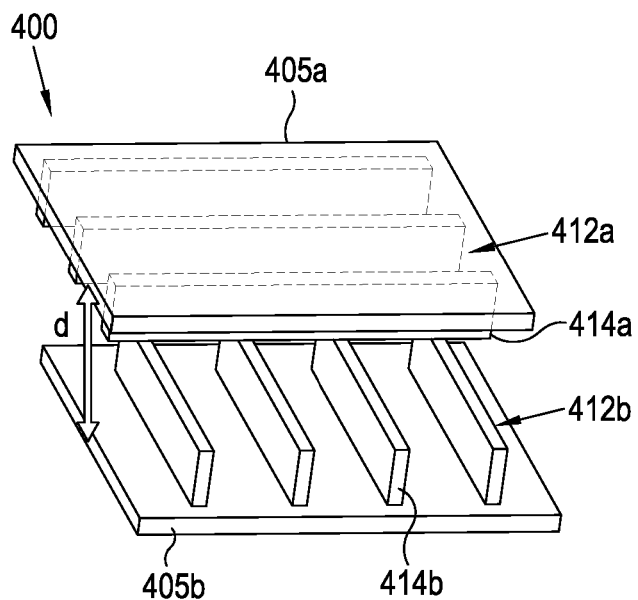
FIG. 4A shows a schematic representation of another liquid crystal device comprising two diffraction gratings in accordance with an embodiment of the invention.

FIG. 4A shows another liquid crystal device 400. The liquid crystal device 400 is similar in structure to the liquid crystal devices 200, 300 described above. However, the liquid crystal device 400 comprises a first diffraction grating 412a and a second diffraction grating 412b, each comprising a plurality of parallel polymer walls 414a, 414b. In the embodiment shown, the diffraction gratings 412a, 412b are orthogonal to one another. That configuration is convenient because the diffraction patterns from each diffraction grating 412a, 412b are easy to interpret, and their orthogonality should be highly apparent. However, it is not essential that the diffraction gratings 412a, 412b are orthogonal to one another.

In the embodiment shown, the polymer walls 414a of the first diffraction grating 412a are fabricated such that they are tethered to (e.g., fabricated on) a first transparent substrate 405a of the liquid crystal device 400. The polymer walls 414b of the second diffraction grating 412b are fabricated such that they are tethered to (e.g., fabricated on) the second transparent substrate 405b of the liquid crystal device. The substrates 405a, 405b are separated by a thickness d. However, that is not essential, and the polymer walls 414a, 414b of one or both of the diffraction gratings 412a, 412b may not be tethered to a substrate, but may be formed at an intermediate position through the thickness d of the liquid crystal composition between the substrates 405a, 405b. For example, one or more of the polymer walls 414a, 414b each diffraction gratings 412a, 412b may be at least partially tethered or secured to one or more of the polymer walls 414a, 414b of the other diffraction grating 412a, 412b. Forming different polymer structures such as sets of polymer walls at different depths through a thickness d of the liquid crystal composition between the substrates 405a, 405b enables the different polymer structures to be formed in the same area or region of the device 400 whilst still allowing the polymer structures to operate (e.g., spatially modulate a phase of light incident on the device) independently from one another. Each polymer structure may be formed in or comprise a separate or distinct sub-layer of the liquid crystal layer (e.g., the liquid crystal layer disposed between the substrates 405a, 405b).

Figure 4B:
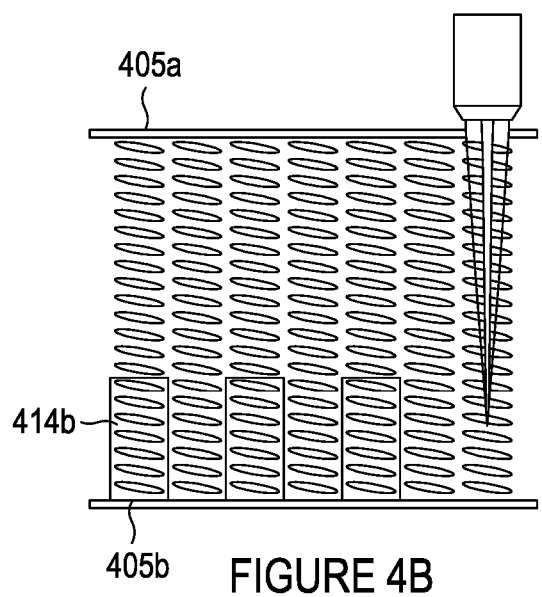
FIGS. 4B and 4C show a schematic cross-section of the liquid crystal device of FIG. 4A during the fabrication process.
Figure 4C:
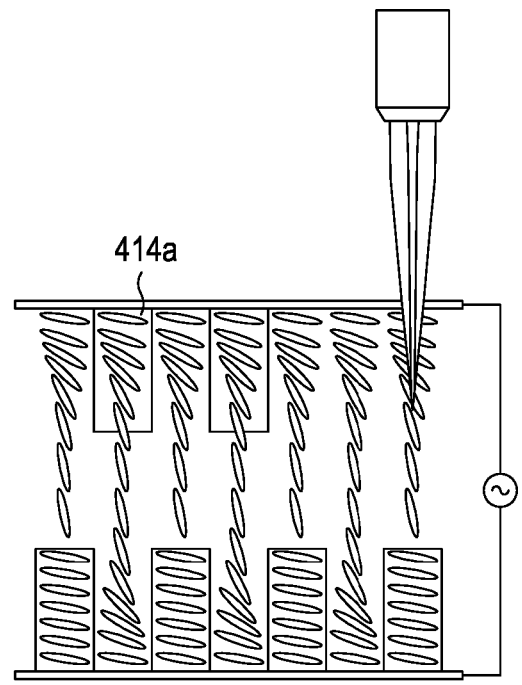

FIGS. 4B and 4C illustrate a schematic cross-section of the liquid crystal device 400 during the fabrication process. The focus depth of the laser is changed during fabrication in order to tether the polymer walls 414a, 414b to opposite substrates 405a, 405b. Using a 0.46 NA objective lens results in an expected voxel size of approximately 11 μm. To ensure strong tethering of the polymer walls 414a, 414b to the respective substrates 405a, 405b, the focus depth of the fabrication laser was adjusted such that approximately half the voxel was within the substrates 405a, 405b. However, as noted above, it is not essential that the polymer walls 414a, 414b are tethered to the substrates 405a, 405b. In addition to the change in fabrication height, the voltage applied to the liquid crystal composition is also changed during the process so that the polymer walls 414a, 414b comprising each diffraction grating are written at different voltages. For clarity, in the example shown, the second diffraction grating 412b is shown being written at 0 V and the first diffraction grating 412a is shown being written at an arbitrary voltage above the Fréedericksz threshold voltage for the device 400. However, it is not necessary for one of the fabrication voltages to be 0 V, and the first and second diffraction gratings 412a, 412b may be written at any two sufficiently different voltages.

Figure 4D:
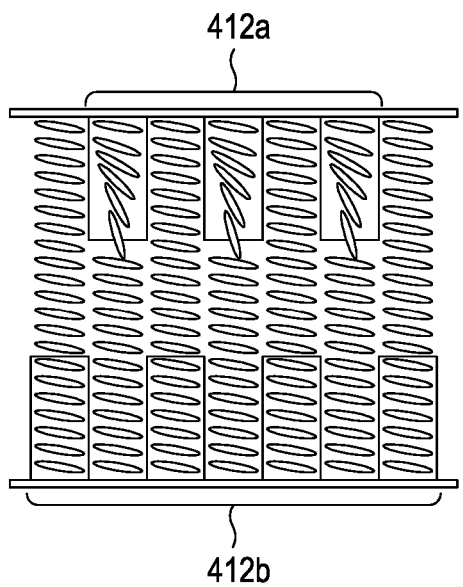
FIGS. 4D and 4E show a schematic representation of the switching behaviour of the liquid crystal device of FIG. 4A.
Figure 4E:
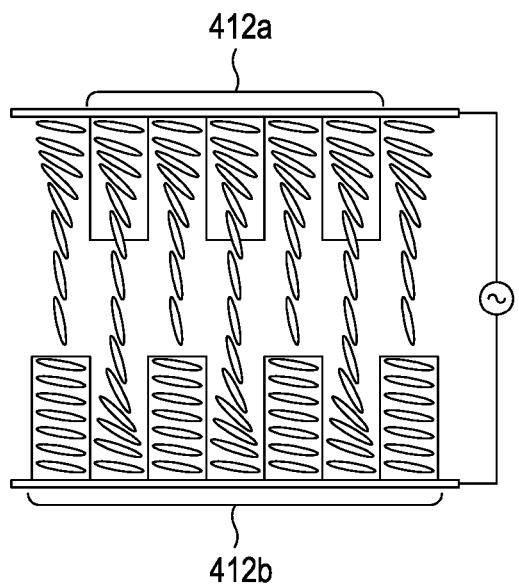

FIGS. 4D and 4E illustrate the switching behaviour of the bilayer diffraction grating device 400 after fabrication of the two diffraction gratings 412a, 412b. At the write-voltage for the second diffraction grating 412b (0 V), the first diffraction grating 412a is active, as the polymer walls 414a of the first diffraction grating 412a have a locked-in non-zero voltage liquid crystal state. That creates a refractive index modulation for the first diffraction grating 412a between the polymer walls 414a and the unpolymerized liquid crystal composition, while for the second diffraction grating 412b the direction alignment is uniform across both the polymer walls 414b and the unpolymerized liquid crystal composition. In order to switch to or activate the second diffracting grating 412b, an applied voltage with a magnitude equal to the write-voltage for the first diffraction grating 412a is applied to the device 400. That renders the first diffraction grating 412a inactive (due to uniform liquid crystal director alignment at the first diffraction grating 412a) and switches the second diffraction grating 412b to an active state. The unpolymerized liquid crystal composition is now in the same liquid crystal state as the liquid crystal state for the polymer walls 414a of the first diffraction gating 412a, so there is no refractive index modulation for the first diffraction grating 412a. However, there is a refractive index modulation for the second diffraction grating 412b, owing to the difference in director alignment between the polymer walls 414b and the switched unpolymerized liquid crystal composition.

The respective write-voltages used for fabricating the first and second diffraction gratings 412a, 412b of the device 400 may be selected to maximise diffraction efficiency for each grating 412a, 412b, although that is not essential. For example, for maximum diffraction efficiency in a binary phase diffraction grating, the phase difference must be equal to x. By finding out the relationship between phase and voltage for the device 400, the polymer structures or diffraction gratings 412a, 412b of the device 400 may be written at two distinct voltages with a phase difference equal to x. The relationship between phase and voltage is dependent on a number of variables such as the wavelength of the incident light, the thickness of the liquid crystal device 400, and the birefringence of the liquid crystal composition. The relationship between phase and voltage for the device 400 can be established experimentally in a straightforward manner by studying the transmissive behaviour of the device 400 when oriented between crossed polarisers, before the polymer walls 414a, 414b are written.

Figure 5A:
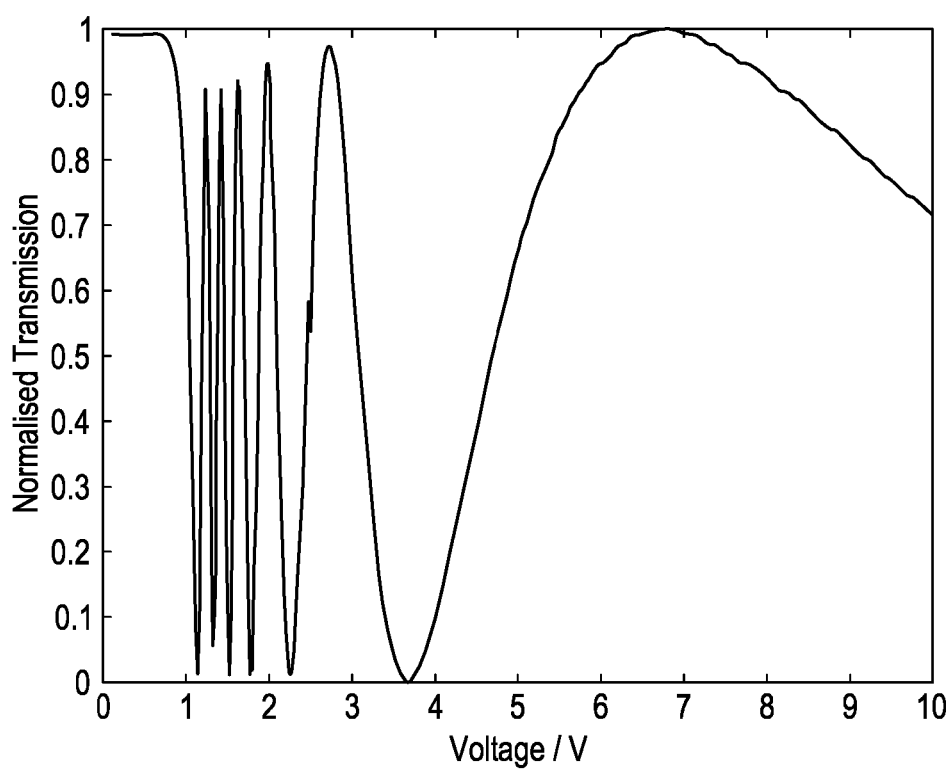
FIG. 5A shows a plot of transmission as a function of voltage for another liquid crystal device in accordance with an embodiment of the invention.
Figure 5B:
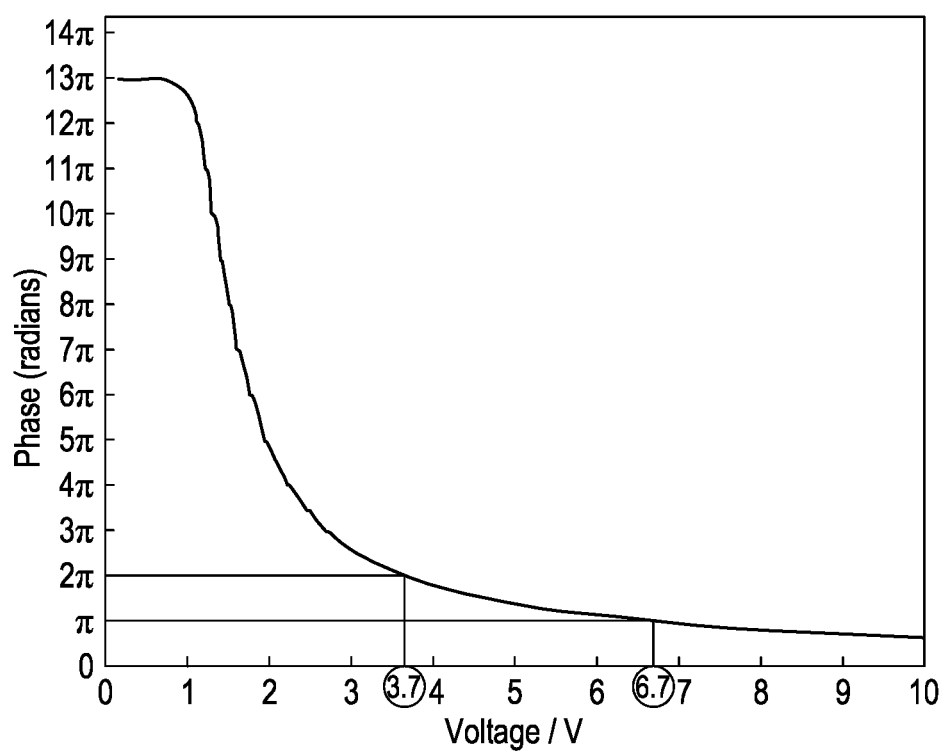
FIG. 5B shows a plot of phase as a function of voltage for light passing through the liquid crystal device.

FIGS. 5A and 5B show electro-optic characterisation of a liquid crystal device 500 before the polymer walls 514a, 514b are written. In the embodiment shown, the device 500 had a substantially identical structure to that of the liquid crystal device 400, with like reference numerals indicating like features. In the embodiment shown, the device 500 had a thickness (distance d between substrates 505a, 505b) of 20 μm. That enables spatial separation of the first and second diffraction gratings 512a, 512b in a direction normal to the substrates 505a, 505b, although that is not essential. For the device 500 having a thickness of 20 μm and illuminated at a wavelength of 635 nm, write voltages of 3.7 V and 6.7 V were selected for the first and second diffraction gratings 412a, 412b respectively to maximise diffraction efficiency, although that is not essential.

FIG. 5A shows a plot of transmission as a function of voltage for the device 500 oriented between crossed polarisers. The device 500 was oriented with the optic axis at 45° to the polarisers and illuminated using a laser diode having a wavelength of 635 nm (Thorlabs PL202). The voltages of a peak and a trough in the plot of transmission vs voltage are selected. Peaks indicate where the device 500 is effectively functioning as a half-waveplate, and the polarisation is rotated by 90° from the polarizer axis to the analyzer axis. Troughs indicate where the device 500 is effectively functioning as a full-waveplate (lambda plate) and the polarisation orientation is unchanged from the original orientation of the polarizer, resulting in extinction after the analyzer.

The transmission of a birefringent layer between crossed polarisers, T, with its optical axis at 45° to the polariser axes, can be related to phase, $\phi$, through the equation $T=\sin^2(\phi/2)$. In that relationship, the transmission is normalised to the maximum transmission through the device. Using that equation, the phase can be extracted from the plot of transmission as a function of voltage shown in FIG. 5A. FIG. 5B shows a plot of phase as a function of voltage for light passing through the device 500, illustrating the voltages of 3.7 V and 6.7 V result in a phase difference of x for the device 400 illuminated using a wavelength of 635 nm.

Figure 5C:
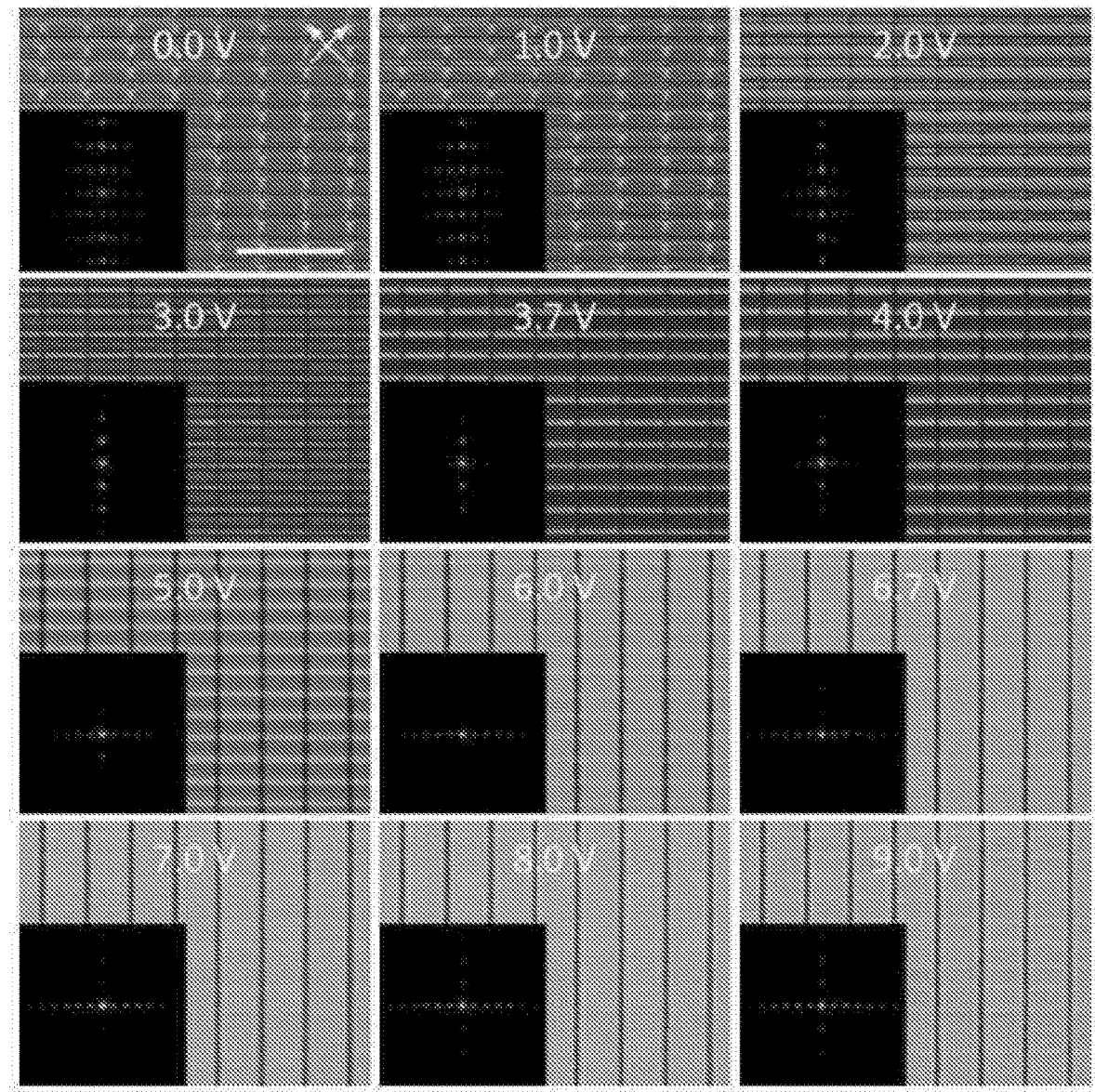
FIG. 5C shows a sequence of polarised optical microscope images for the liquid crystal device characterised in FIGS. 5A and 5B following the fabrication of two diffraction gratings.

FIG. 5C shows a sequence of polarised optical microscopy images of the liquid crystal device 500 under different applied voltage conditions (from 0 V to 9 V in 1 V increments, with additional images at 3.7 V and 6.7 V), with inset images of the corresponding diffraction patterns. The second diffraction grating 512b tethered to the second substrate 505b was written at 3.7 V with a grating period of 20 μm, with the polymer walls 514b being vertically-oriented in the POM images. The first diffraction grating 512a tethered to the first substrate 505a was written at 6.7 V with a grating period of 10 μm, with the polymer walls 514a being horizontally-oriented in the POM images. The polymer walls 514a, 514b of the first and second diffraction gratings 512a, 512b are therefore arranged orthogonally to one another (although that is not essential). However, it will be appreciated the polymer walls 514a, 514b may be written at other voltages, or at 0 V. The scale bar in the bottom right-hand corner of the image at 0 V is 50 μm.

At applied voltages near to the write voltage for the second diffraction grating 512b (3.7 V), the second diffraction grating is invisible in the POM images due to the homogeneity between the director orientation in the polymer walls 514b and the unpolymerized liquid crystal composition. The first diffraction grating 512a is visible in the POM images at those voltages because the polymer walls 514a were written at 6.7 V and therefore have a locked-in director profile that is different to the director profile of the unpolymerized liquid crystal composition. The horizontally-oriented polymer walls 514a of the first diffraction grating 512a are clearly visible in FIG. 5 at voltages near to 3.7 V.

At applied voltages near to the write voltage for the first diffraction grating 512a (6.7 V), the first diffraction grating 512a becomes invisible as the director orientation in the unpolymerized liquid crystal composition and the polymer walls 514a is the same. Therefore, at those voltages, the vertically-oriented polymer walls 514b of the second diffraction grating 512b are visible due to the different director alignment in the polymer walls 514b and the unpolymerized liquid crystal composition.

On closer inspection, it appears the diffraction pattern produced by the second diffraction grating 512b is in fact most visible at 3.0 V, rather than the writing voltage of 3.7 V. That effect is likely to be caused by the polymer walls 514a of the first diffraction grating 512a, written at 6.7 V, exerting an elastic influence on the unpolymerized liquid crystal composition in the device 500. The director alignment locked-in at the higher voltage may create an anchoring surface in the device 500 that influences the unpolymerized liquid crystal composition to match the alignment at 6.7 V, which may effectively lower the index-matching voltage for the second diffraction grating 512b.

Figure 6:
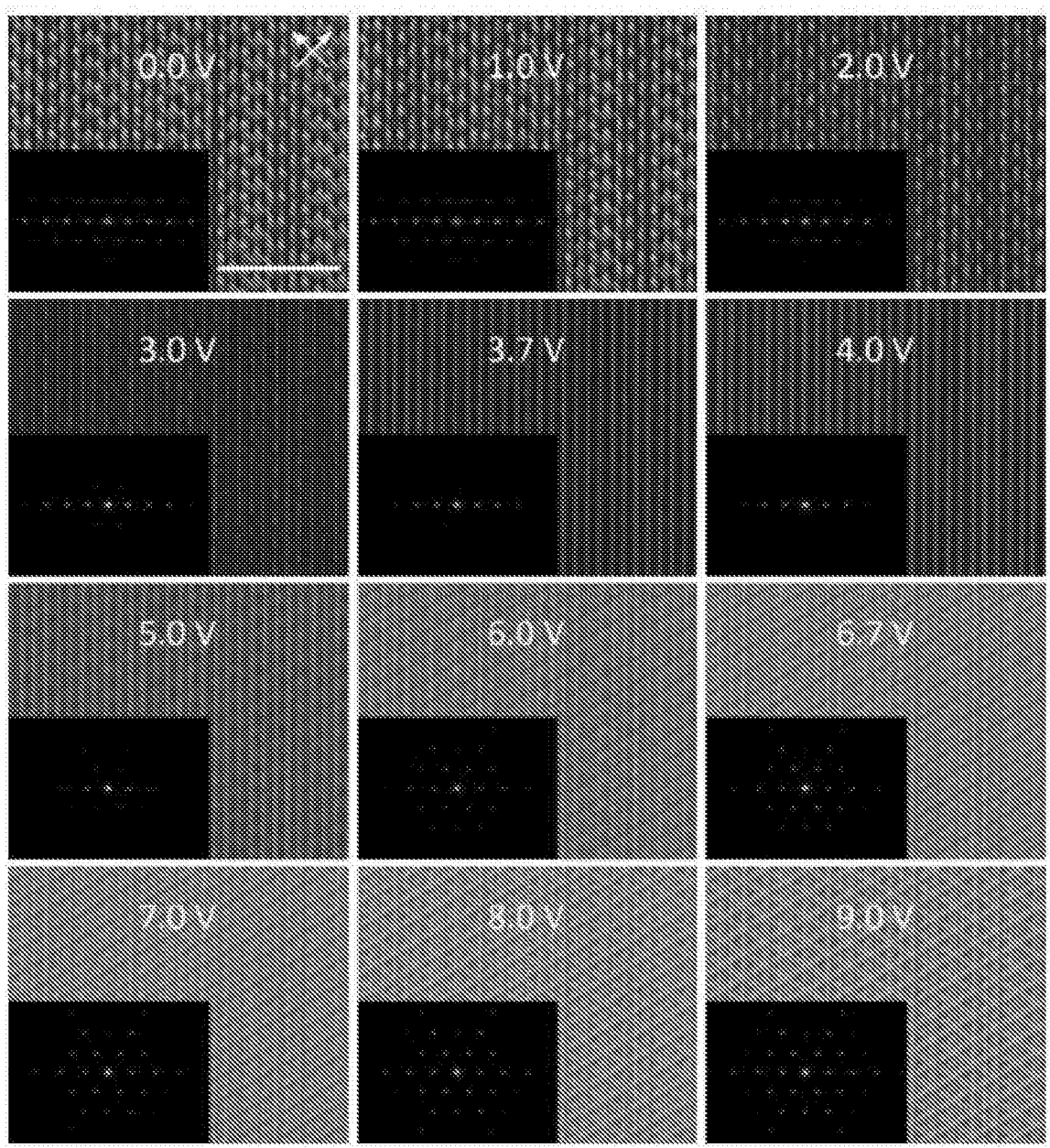
FIG. 6 shows a sequence of polarised optical microscope images for another liquid crystal device comprising two diffraction gratings in accordance with an embodiment of the invention.

FIG. 6 shows a sequence of polarised optical microscopy images of another liquid crystal device 600. The liquid crystal device 600 is similar to the device 500 described above, with like reference numerals indicating like features. In the device 600, the second diffraction grating 612b comprises a triangular mesh of polymer walls 614b producing a hexatic diffraction pattern in the far-field. The first diffraction grating 612a is a conventional one-dimensional diffracting grating comprising polymer walls 614a, as described above. The same cell thickness and write voltages were used as for the device 500 above. The second diffraction grating 612b comprises periodic triangular elements with a pitch of 5 μm written at 3.7 V, while the first diffraction grating 612a comprises a plurality of polymer walls 614a written at 6.7 V with a grating period of 5 μm. However, it will be appreciated the polymer walls 614a, 614b may be written at other suitable voltages, or at 0 V. The scale bar in the bottom right-hand corner of the image at 0 V is 50 μm.

At applied voltages near the write voltage of the triangular second diffraction grating 612b (3.7 V), only the 1D diffraction pattern produced by the first diffraction grating 612a is visible. As the applied voltage increases towards the writing voltage of the first diffraction grating 612a (6.7 V), the diffraction pattern observed changes to the hexatic diffraction pattern produced by the second diffraction grating 612b.

Figure 7A:
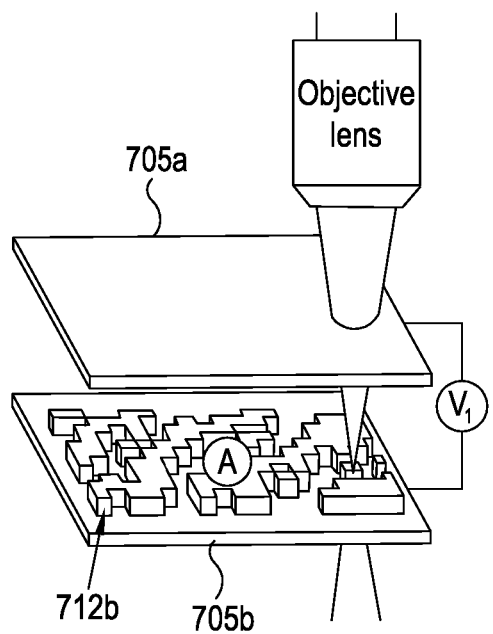
FIGS. 7A and 7B show the fabrication of another liquid crystal device comprising a first and second computer-generated holograms in accordance with an embodiment of the invention.
Figure 7B:
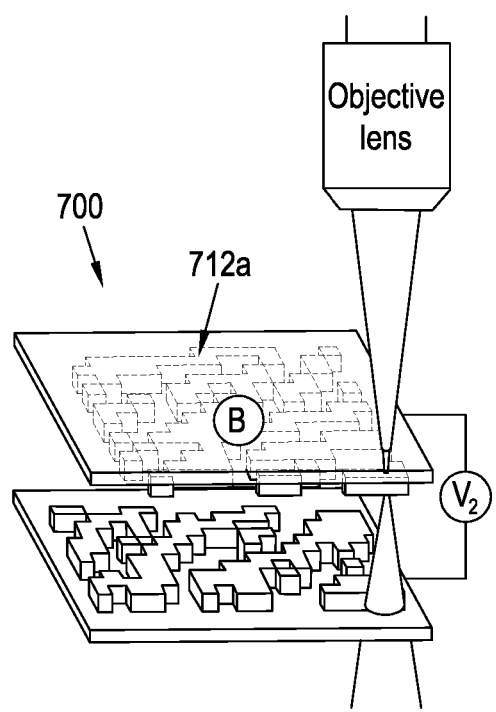

FIGS. 7A and 7B show the fabrication of another liquid crystal device 700. The liquid crystal device 700 is similar to the devices 500, 600 described above, with like reference numerals indicating like features. However, instead of first and second diffraction gratings, the device 700 comprises first and second holograms 712a, 712b. Holograms are diffractive optical elements that produce a recognisable image in the far-field diffraction pattern. The phase maps that define a hologram are highly aperiodic. The direct laser writing process described above is well-suited to the task of fabricating such a structure, due to the ability to arbitrarily control the exposure pattern of the writing laser.

The fabrication procedure is substantially as described above in respect of the device 500. Firstly, a voltage V1 is applied to the device 700, and a second binary-phase computer generated hologram (CGH) 712b (also labelled A) is fabricated. In the embodiment shown, the polymer structures which represent the pixels of the second CGH 712b are tethered to the second substrate 705a, although that is not essential. Following this, a voltage V2 is applied to the device 700 and the position of the laser focus is adjusted upwards so that a first binary-phase CGH 712a (also labelled B) can be fabricated. In the embodiment shown, the polymer structures which represent the pixels of the first CGH 712a are tethered to the first substrate 705a, although that is not essential. The application of a voltage causes the director alignment in the liquid crystal composition to change, and the formation of a polymer network at a given voltage then stabilises the director alignment in that state.

Figure 7C:
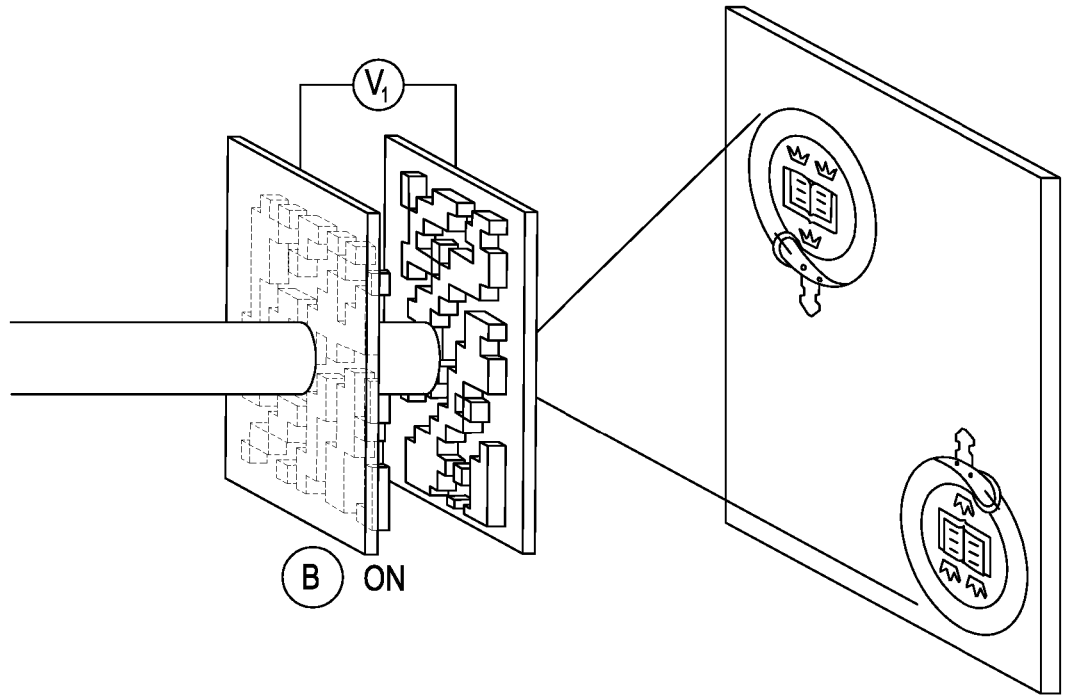
FIGS. 7C and 7D show patterns generated by the first and second hologram respectively.
Figure 7D:
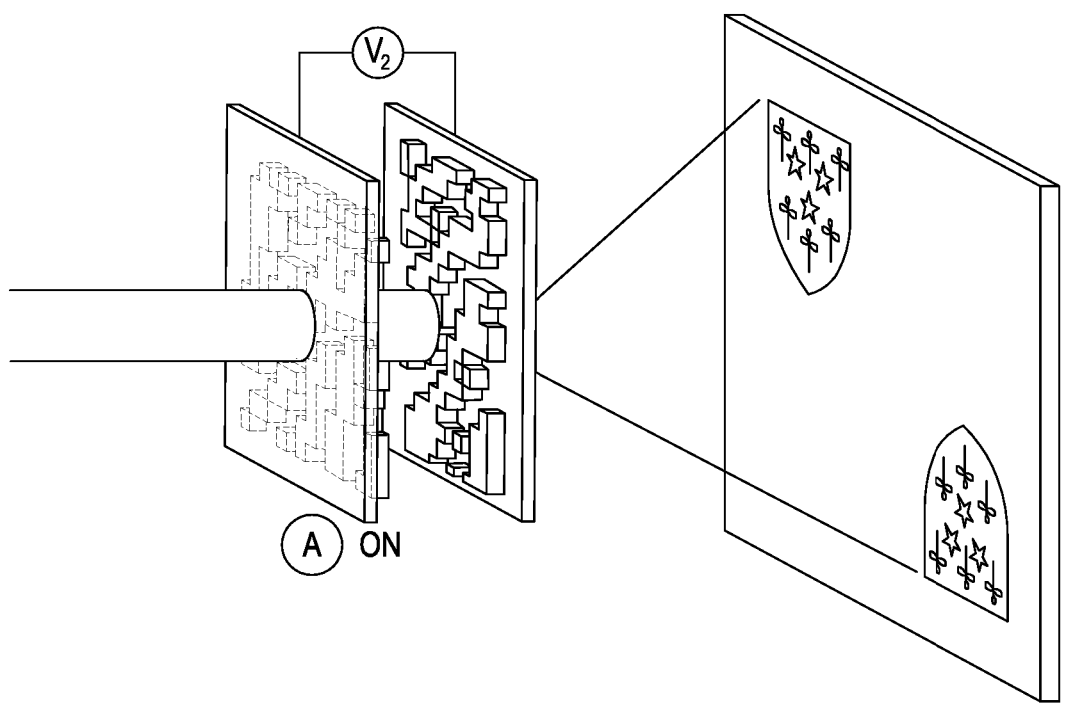

After fabrication, the device 700 is operated by illuminating the device with a collimated laser beam that is linearly polarised in a direction parallel to the optic axis of the liquid crystal composition. The far-field diffraction pattern can then be viewed and studied on a screen. As shown in FIGS. 7C and 7D, when voltage V1 is applied to the device 700, there is no contrast in the director alignment between the polymerized pixels of the second CGH 712b written at V1 and the unpolymerized liquid crystal composition. The incident light will therefore see a uniform refractive index profile for the second CGH 712b and no diffraction will occur. In contrast, at an applied voltage V1, there is a difference in the director alignment between the polymerized pixels of the first CGH 712a and the unpolymerized liquid crystal composition. That manifests as the incident light seeing a spatially varying effective refractive index for the first CGH 712a which produces a diffraction pattern corresponding to the first CGH 712a in the far-field.

Conversely, at an applied voltage V2, the situation is reversed and the first CGH 712a is inactive, the second CGH 712b is active, and the far-field diffraction pattern switches to that produced by the second CGH 712b alone. In that way, the device 700 can be switched between two distinct diffraction patterns after fabrication, simply by applying the write voltages used fabrication to the device 700.

Figure 8:
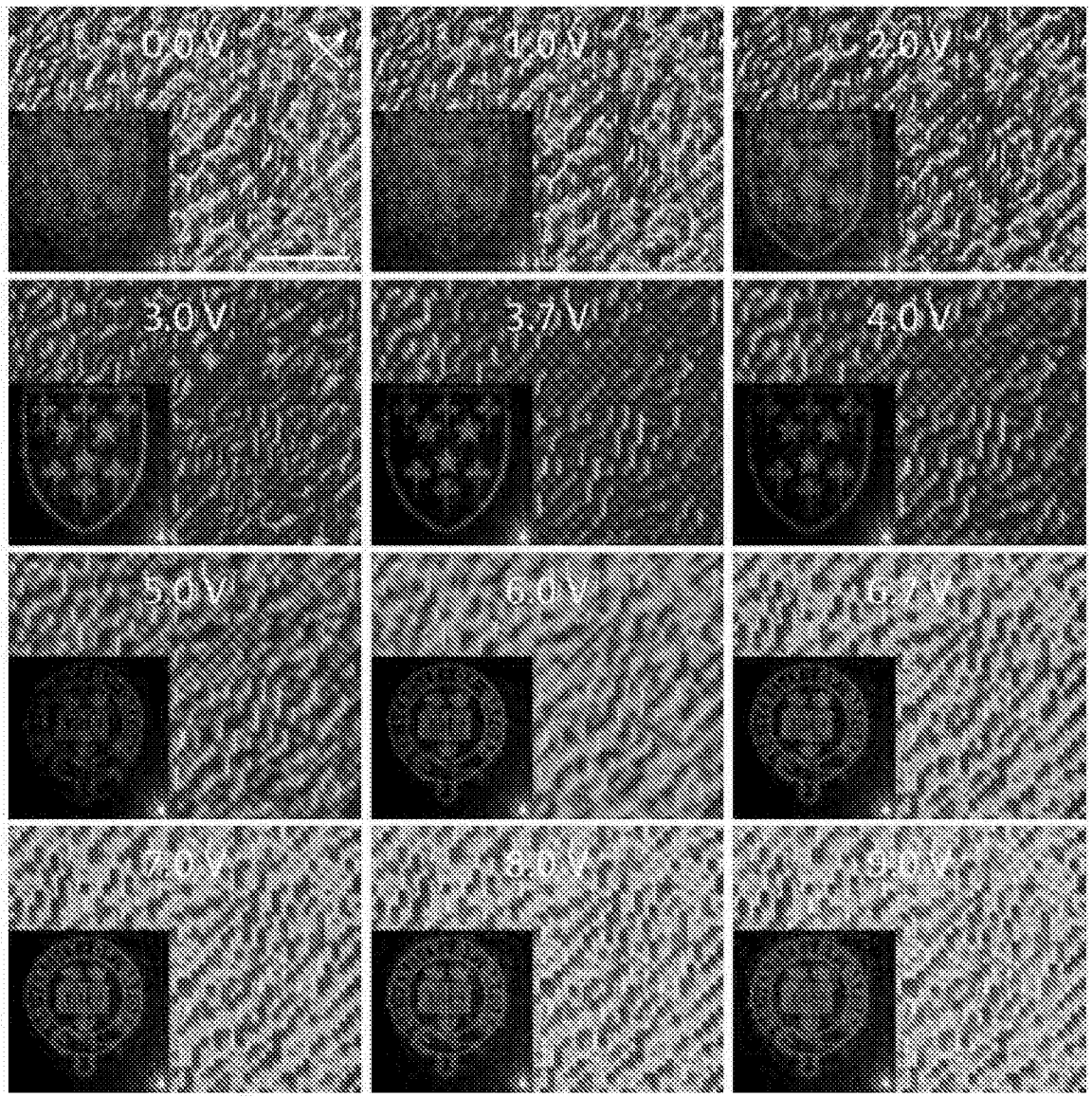
FIG. 8 shows a sequence of polarised optical microscope images for another liquid crystal device comprising two computer-generated holograms in accordance with an embodiment of the invention.

FIG. 8 shows a sequence of polarised optical microscopy images of another liquid crystal device 800 under different applied voltage conditions (from 0 V to 9 V in 1 V increments, with additional images 3.7 V and 6.7 V). The liquid crystal device 800 comprises two binary CGHs 812a, 812b, similar to the device 700 described above. The corresponding diffraction patterns or images produced by the CGHs are inset in the images.

The second CGH 812b was designed to recreate an image of the University of Oxford logo and was written at 3.7 V, whereas the first CGH 812a was designed to recreate an image of the Somerville College crest and was written at 6.7 V. However, it will be appreciated that the CGHs 812a, 812b may be written at voltages other than 3.7 V and 6.7 V. The device 800 shows a real-world example of the device 700 described above and shown schematically in FIGS. 7A to 7D.

The operation of the device 800 is similar to the devices 500 to 700 described above and shown in FIGS. 5 to 7, where applying the write voltage for a CGH renders it inactive. For applied voltages close to the write voltage of the second CGH 812b, only the diffraction pattern from the first CGH 812a can be seen (an image of the Somerville College crest). For applied voltages closer to the write voltage of the first CGH 812a, only the diffraction pattern from the second CGH 812b can be seen in the far-field (an image of the University of Oxford logo). In this way, the diffraction pattern or image produced by the device 800 can be switched between two distinct images simply by changing the magnitude of the voltage applied to the device 800.

In the embodiment shown, the CGHs were produced using the Gerchberg-Saxton (GS) algorithm implemented in MATLAB. The target images for the bilayer CGH were a 512×512 pixel image of the University of Oxford logo and a 300×300 pixel image of the Somerville College crest. Those images were resized to 128×128 pixel images before being placed in the upper left corner of a black 256×256 pixel image. The reason for placing the desired target in the upper corner of the input to the GS algorithm is to prevent overlap in the replay field with the zero-order spot and the conjugate image. The output of the GS algorithm was a 256×256 pixel binary hologram. The holograms were written using the direct laser writing process described above over an area of 1024×1024 µm, such that each pixel of the hologram was a size of 4×4 µm. The fabrication was performed in a device having a substrate separation or thickness of 20 µm. A MATLAB script converted the hologram designs into AeroBasic fabrication scripts which wrote the holograms line by line with a spacing of 1 µm between adjacent lines. The replay fields were captured with the aid of a Fourier lens to bring the far-field diffraction pattern to the plane of a CCD. It will be appreciated, however, that CGHs may be produced using any suitable method.

Figure 9:
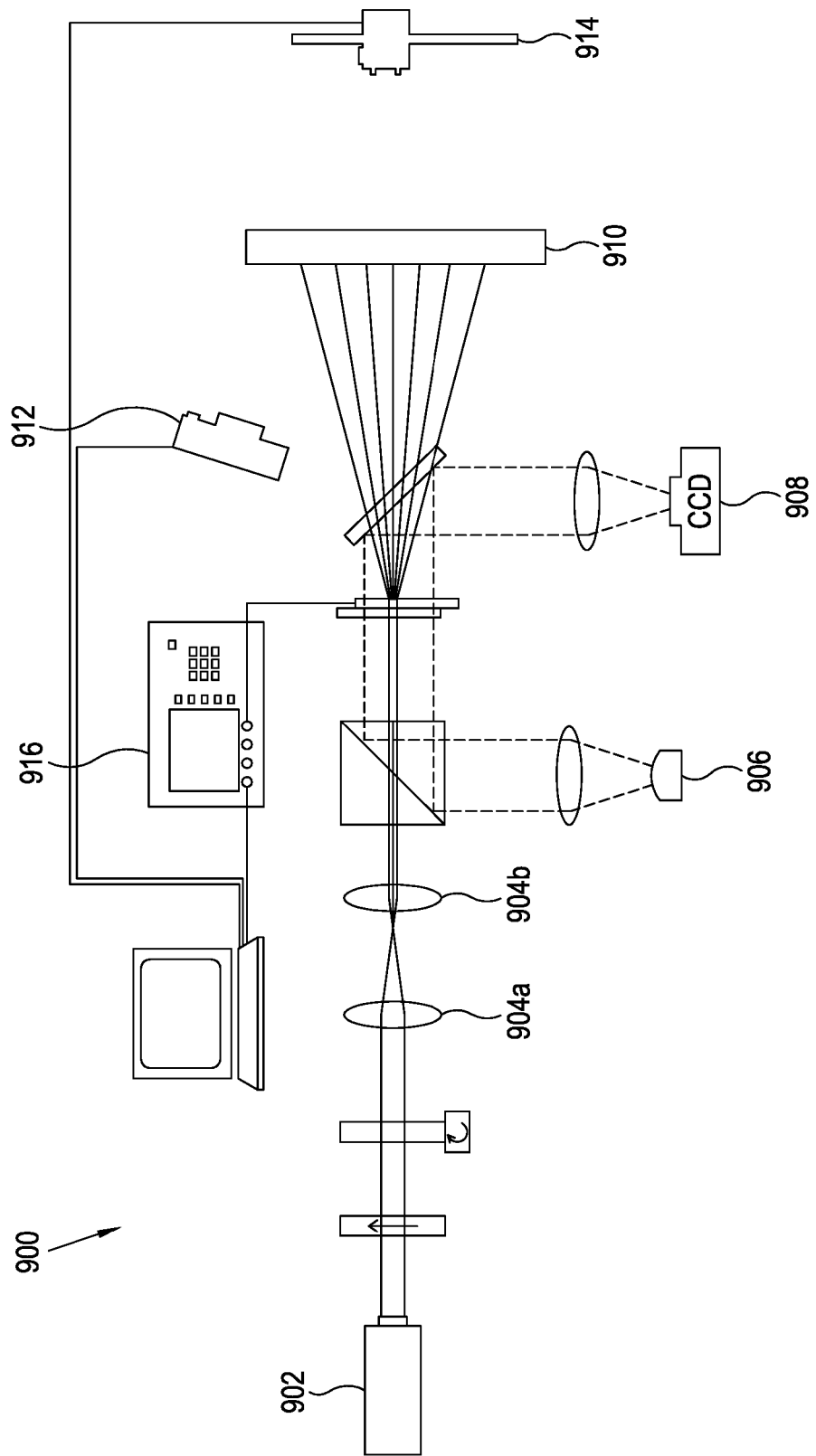
FIG. 9 shows an optical set up used to characterise the liquid crystal devices.

The diffractive structures or DOEs in the devices 200 to 800 described above were characterised using the custom-built optical setup 900 shown in FIG. 9. The light source was a 635 nm laser diode 902 (Thorlabs PL202) having a beam diameter of 3 mm and an optical power of 1 mW. To selectively illuminate a particular DOE within a device, the beam was shrunk by two lenses 904a, 904b in a telescope configuration. For some DOEs written over a very small area, the beam had to be focused with a 300 mm lens in order to produce a beam size small enough to fit entirely within the area of a structure. The output power of the laser diode was reduced to 100 µW with a variable ND filter to provide a suitable power for the CCD and photodiode. To allow targeting and positioning of the laser beam, the sample was mounted on a stack of precise manual translation stages (Thorlabs PT1) with a travel range of 25 mm in x and y directions. To aid with locating and identifying DOEs within the devices, a simple optical microscope was built, with illumination provided by a fibre-coupled 660 nm LED 906. The optical path of the 635 nm laser diode 902 is indicated by the red lines in FIG. 9, while the 660 nm LED 906 illumination path is indicated by the purple dashed lines in FIG. 9. A full-colour CCD camera 908 (Thorlabs DCC1240C) was used to provide a magnified image of the device so it could be moved to the correct position. The diffraction pattern could be recorded by either i) taking an image of the screen 910 using a full-colour CCD 912 (Thorlabs DCU224C) with a camera lens attached or ii) recording the diffraction intensity directly with a photodiode 914 (Thorlabs PDA36A-EC). MATLAB scripts were written to run voltage sweeps and automate the experimental process of obtaining diffraction data from DOEs. An arbitrary function generator 916 (Tektronix AFG 3021) was controlled to provide the AC driving voltage to the DOE, while data was recorded by either the CCD 912 focused on the screen 910 or the photodiode 914. For the latter method, the voltage sweep had to be repeated for each diffracted order, realigning the photodiode 914 between each measurement. The MATLAB script interfaced with the CCD camera 912 via a .NET library, whereas the photodiode 914 was connected to a digital oscilloscope (Tektronix TDS2024C) which was read via SCPI commands to return the voltage signal from the photodiode 914.

The liquid crystal devices 500 to 800 described above illustrate how writing multiple diffractive structures or diffractive optical elements (DOEs) within one device increases the functionality and utility of the device. The devices 500 to 800 can be switched between a plurality of distinct diffractive states, rather than simply between on and off (i.e., producing a diffraction pattern or not producing a diffraction pattern) as for conventional liquid crystal switchable diffractive optics. The devices 500 to 800 described above each comprise two DOEs written at different voltages, although it will be appreciated that more than two diffractive structures or DOEs may be written into the devices at different write voltages. That increased functionality may also be provided with simple control to switch between diffractive states, by increasing or decreasing a voltage applied to the device, rather than the complex backplane electronics typically required by switchable SLMs. Intermediate states combining a spatial phase modulation contribution from two or more polymer structures (having the same or different selected locked-in liquid crystal states) may also be achieved. In addition, by writing the polymer structures of each DOE at a different depth in a thickness of the liquid crystal composition in the device, that increased functionality can be provided without increasing a footprint of the device. The diffractive structures may at least partially spatially overlap one another in a direction extending through a thickness of the device.

Another benefit of the switchable devices 500 to 800 described above is that multiple modes of operation may be supported. In many previously reported liquid crystal diffraction gratings, including H-PDLC technology, fabricated devices are optically active by default (i.e., when no voltage is applied), such that a voltage is required to switch the device off. This is known as conventional mode operation. That limitation means H-PDLC devices consume power in the off-state, which can be an undesirable characteristic for many applications where power consumption is an important design parameter. In contrast, with the switchable devices described above, diffractive structures can be engineered to operate in reverse mode and be optically inactive with no applied voltage, by writing the polymer structures at 0 V during fabrication. Additionally, the devices described above may also comprise diffractive structures engineered to operate in conventional mode (with diffraction produced by default at 0 V), by fabricating polymer structures at an applied voltage above the Fréedericksz threshold.

Potential uses of the liquid crystal devices described herein include 3D distance-sensing and/or depth mapping, where diffraction gratings are used to create structured light illumination patterns. Conventional depth-mapping technologies such as Apple's Face ID system and Microsoft's Kinect produce a fixed dot grid to illuminate a scene. For the high-resolution depth sensing required to process the movements of individual fingers and subtle changes in facial expression, illumination grids of thousand of infrared dots are projected onto a scene of interest and processed by cameras and dedicated ASICs. The liquid crystal devices described above could be employed as switchable dot projectors able to two different illumination patterns onto a scene. It may be advantageous to combine multiple optical functions in one switchable device, as many applications that use 3D depth mapping technology (including head-mounted displays) require extensive miniaturisation and have stringent power consumption requirements.

There is also considerable potential for use of the liquid crystal devices described above in advanced applications in holography. Stacked or cascaded CGHs have been used for applications including multiplexed information display, colour images and multiwavelength optical interconnects. Furthermore, stacked CGHs have been employed to improve image resolution and diffraction efficiency over conventional single-layer CGHs. The liquid crystal devices of the present disclosure may provide such advantages within a single device that is easily controllable by adjusting an applied voltage.

Another potential use for the liquid crystal devices described above may be in aberration correction, where switching between different phase profiles with a uniformly applied voltage significantly simplifies the operation of such a device compared to, for example, the complex active-matrix backplane electronics needed to drive the pixels in a conventional SLM. The liquid crystal devices may be incorporated into or used in conjunction with optical devices (for example, lenses, microscopes etc.) to provide aberration correction for those optical devices. Each diffractive element in the liquid crystal devices may be configured to address a different aberration mode, and may be selectively activated and/or deactivated by controlling an applied voltage as desired.

Figure 10A:
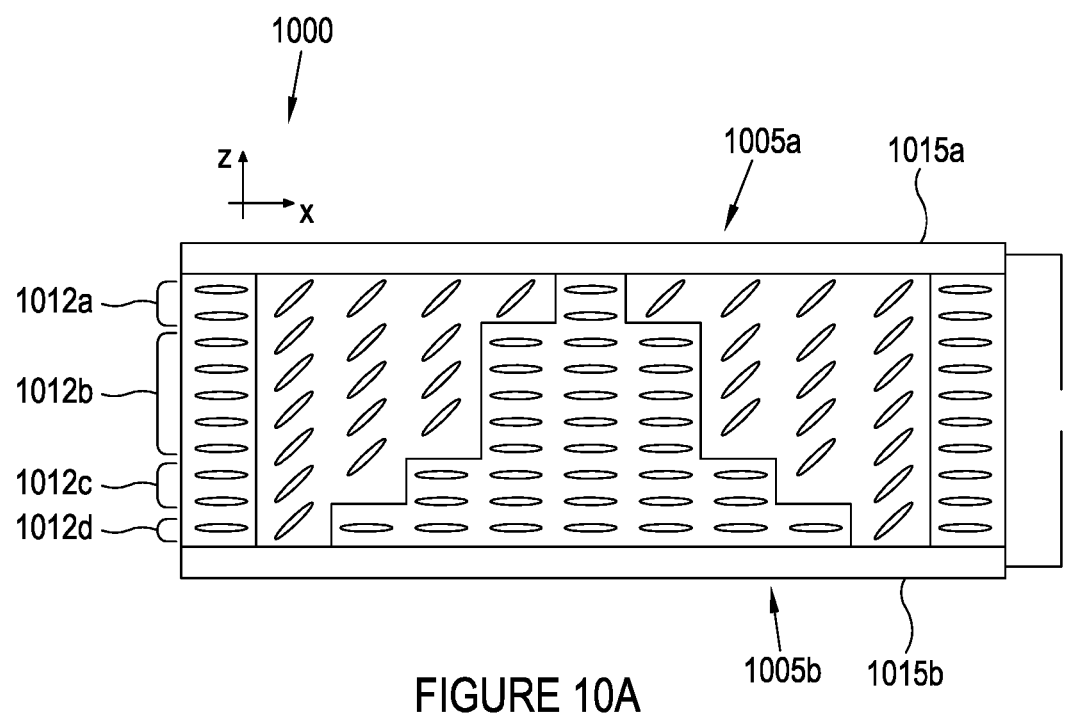
FIGS. 10A and 10B show another liquid crystal device comprising a plurality of polymer structures forming an arrangement of concentric rings.
Figure 10B:
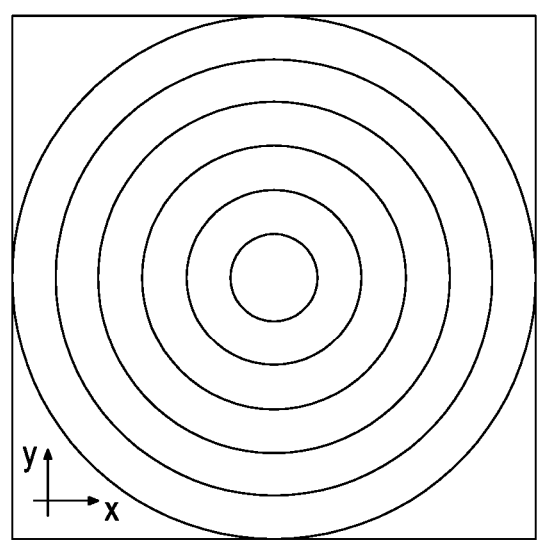

FIG. 10A shows a schematic of another liquid crystal device 1000. The liquid crystal device 1000 is similar to the devices 500 to 800 described above, with like reference numerals indicating like features. The device 1000 comprises a plurality of polymer structures 1012a-1012d. Each polymer structure 1012a-1012d is located at a different depth in the thickness of the liquid crystal layer disposed between the substrates 1005a, 1005b. Each polymer structure 1012a-1012d may alternatively be thought of as being formed in or comprising a separate or distinct sub-layer in the liquid crystal layer. In the embodiment shown, the plurality of polymer structures 1012a-1012d may also be considered as together forming a plurality of stacked plates or discs of varying diameter and thickness, and/or an arrangement of concentric rings (shown in plan view in FIG. 10B), each having a different height or thickness. However, that is not essential, and other arrangements of polymer structures may be used. In the embodiment shown, the polymer structure 1012a is tethered to the first substrate 1005a and the polymer structure 1012d is tethered to the second substrate 1005b. The polymer structure 1012b is tethered to the polymer structures 1012a, 1012c and the polymer structure 1012c is tethered to the polymer structures 1012b, 1012d.

However, in the device 1000, each of the polymer structures 1012a-1012d is written at the same voltage (rather than at a different voltage as for the devices 500 to 800 described above), as indicated by the common director orientation shared by the liquid crystal molecules in the polymer structures 1012a-1012d. In the embodiment shown, each of the polymer structures 1012a-1012d is written at 0 V, although the polymer structures 1012a-1012d may alternatively be written at any suitable voltage.

Rather than switching between different active states by varying the applied voltage, the device 1000 is configured to provide a variable phase change at different areas within the device 1000. When a voltage is applied across the device 1000, the liquid crystal molecules in the unpolymerized liquid crystal composition reorient in response to the applied voltage. In the embodiment shown, the arrangement of the polymer structures 1012a-1012d effectively provides a different thickness of polymerized liquid crystal composition at each lateral or radial position in the device 1000 (e.g., in the x-direction shown in FIG. 10A). The different thicknesses of the polymerized liquid crystal composition at each position are configured to modulate a phase of light incident on the device 100 by a different amount at each position. In addition, a magnitude of the phase modulation may also be adjusted (e.g., increased or decreased) by adjusting (e.g., increasing or decreasing) the voltage applied across the device 1000, although a relative amount of phase modulation between each of the different positions may remain constant due to the ratios of thicknesses of polymerized liquid crystal composition to unpolymerized liquid crystal composition each position. The polymer structures 1012a-1012d may therefore be operable in conjunction with one another to adjust or control a spatial phase modulation of light incident on the device. The polymer structures 1012a-1012d may together form a diffractive optical element.

The device 1000 may be used to correct for one or more specific aberration modes, for example one or more Zernike modes. The flexibility in fabricating polymer structures as described above may allow the device 1000 to be fabricated to correct for one or more aberration modes which are specific to a particular optical system.

One or both of the electrodes 1015a, 1015b may alternatively comprise a plurality of individually addressable electrode elements. For example, one or both of the electrodes 1015a, 1015b may comprise a patterned electrode or an electrode array rather than a single planar electrode. For example, one or both of the electrodes 1015a, 1015b may be or comprise an array of concentric rings substantially corresponding to the concentric rings formed by the polymer structures 1012a-1012d as described above, although any suitable electrode array may alternatively be used. Each element (e.g., ring) of the array or patterned electrode may be separately or individually addressable. That may enable a voltage to be applied across only a part of the device 1000, which may enable finer spatial control of the magnitude of phase modulation at each radial or lateral position in the device 1000. The electrode array may be or comprise elements having any suitable shape, arrangement and/or size, and may substantially complement or correspond to a shape, arrangement and/or size of the polymer structures.

The device 1000 may alternatively comprise two pluralities of polymer structures. For example, a first plurality of polymer structures 1012a-1012d may be written at a first voltage (for example, 0 V as described above). A second plurality of polymer structures may be written at a second voltage different from the first voltage, substantially as described above with respect to the devices 500 to 800. The first plurality of polymer structures may be written at a first plurality of different depths in the thickness of the liquid crystal layer. The second plurality of polymer structures may be written at a second plurality of different depths, although that is not essential. The second plurality of different depths may be different to the first plurality of different depths. The second plurality of polymer structures may act to correct for one or more different specific aberration modes than are addressed by the first plurality of polymer structures. By applying a voltage across the device 1000 equal to the write voltage of one of the pluralities of polymer structures, that plurality of polymer structures may be rendered optically inactive, substantially as described above. That may enable the device 1000 to switch between different active (e.g., aberration correction) states, substantially as described above for the devices 500 to 800.

Other potential uses of the liquid crystal devices described above include augmented reality (AR) and/or virtual reality (VR) applications, beam steering and beam shaping, and spectroscopy.

The multilayer DOE devices described herein allow switching between a plurality of different phase patterns in a simple, single-pixel liquid crystal device. That functionality may fill a critical gap that exists between fully programmable SLM devices and fixed diffractive optical elements, employable in a wide variety of applications.

From reading the present disclosure, other variations and modifications will be apparent to the skilled person. Such variations and modifications may involve equivalent and other features which are already known in the art of liquid crystal devices, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A liquid crystal device comprising:
a liquid crystal layer having a thickness and comprising:
a liquid crystal material; and
a plurality of polymer structures comprising polymerised liquid crystal material, each polymer structure located at a different depth in the thickness of the liquid crystal layer; and
electrodes configured to apply an electric field to the liquid crystal layer;
wherein each polymer structure has a selected locked-in liquid crystal state;
wherein the polymer structures are arranged to provide different thicknesses of polymerised liquid crystal with a common director orientation at different lateral or radial positions in the device, the different thicknesses configured to modulate a phase of light by a different amount so as to provide a variable phase change at different areas of the device.

2. The liquid crystal device of claim 1, wherein at least two of the polymer structures at least partially spatially overlap one another in a direction extending through the thickness of the liquid crystal layer.

3. The liquid crystal device of claim 1, wherein each polymer structure is configured to provide a different spatial phase modulation of light incident on the device.

4. The liquid crystal device of claim 1, wherein the electrodes are configured to apply an electric field across at least a part of the liquid crystal layer.

5. The liquid crystal of claim 4, further comprising a first electrode and a second electrode configured to apply a field across the thickness of the liquid crystal layer.

6. The liquid crystal device of claim 4, wherein the electrodes are operable to apply a substantially uniform electric field.

7. The liquid crystal device of claim 4, wherein at least one of the electrodes comprises a plurality of individually addressable electrode elements.

8. A liquid crystal device comprising:
a liquid crystal layer having a thickness and comprising:
a liquid crystal material; and a plurality of polymer structures comprising polymerised liquid crystal material, each polymer structure located at a different depth in the thickness of the liquid crystal layer; and electrodes configured to apply an electric field to the liquid crystal layer;

wherein each polymer structure has a different selected locked-in liquid crystal state, wherein each of the different liquid crystal states of the polymer structures corresponds to a state of the liquid crystal material at a different pre-determined electric field strength.

9. The liquid crystal device of claim 8, wherein at least one of the polymer structures comprises a plurality of regions of polymerised liquid crystal material.

10. A liquid crystal device comprising:
a liquid crystal layer having a thickness and comprising:
a liquid crystal material; and
a plurality of polymer structures comprising polymerised liquid crystal material, each polymer structure located at a different depth in the thickness of the liquid crystal layer; and
electrodes configured to apply an electric field to the liquid crystal layer;
wherein each polymer structure has a selected locked-in liquid crystal state,
wherein at least one of the polymer structures is or comprises a diffractive optical element.

11. The liquid crystal device of claim 10, wherein at least one of the polymer structures is or comprises a diffraction grating.

12. The liquid crystal device of claim 11, wherein at least one diffraction grating is configured to produce a hexatic diffraction pattern, and optionally wherein the at least one diffraction grating comprises a triangular mesh.

13. The liquid crystal device of claim 11, wherein at least one diffraction grating is configured to produce a 1-D diffraction pattern, and optionally wherein the at least one diffraction grating comprises a plurality of pillars or walls.

14. The liquid crystal device of claim 10, wherein at least one of the polymer structures is or comprises a hologram.

15. The liquid crystal device of claim 1, further comprising a first substrate and a second substrate, wherein at least one of the polymer structures is tethered or secured to the first substrate or the second substrate.

16. The liquid crystal device of claim 15, wherein the plurality of polymer structures comprises a first polymer structure tethered or secured to the first substrate, and a second polymer structure tethered or secured to the second substrate.

17. The liquid crystal device of claim 1, wherein at least one of the polymer structures is at least partially tethered or secured to one or more other polymer structures.

18. An apparatus for aberration correction, comprising the liquid crystal device of claim 1.

19. A holographic display device comprising the liquid crystal device of claim 13.

20. A method of electrically controlling spatial phase modulation of light incident on a liquid crystal device comprising:
a liquid crystal layer having a thickness and comprising:
a liquid crystal material; and
a plurality of polymer structures comprising polymerised liquid crystal material, each polymer structure located at a different depth in the thickness of the liquid crystal layer; and
electrodes configured to apply an electric field to the liquid crystal layer;
wherein each polymer structure has a selected locked-in liquid crystal state;
wherein the polymer structures are arranged to provide different thicknesses of polymerised liquid crystal with a common director orientation at different lateral or radial positions in the device, the different thicknesses configured to modulate a phase of light by a different amount so as to provide a variable phase change at different areas of the device,
the method comprising:
applying an electric field across the liquid crystal layer to selectively control a spatial phase modulation of light incident on the device.

\* \* \* \* \*